(12) United States Patent
Isono et al.

(10) Patent No.: US 6,404,561 B1
(45) Date of Patent: Jun. 11, 2002

(54) TAKING LENS APPARATUS

(75) Inventors: Masashi Isono, Sakai; Tetsuo Kohno, Suita; Hitoshi Hagimori, Ikoma, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/695,196

(22) Filed: Oct. 24, 2000

(30) Foreign Application Priority Data

Oct. 29, 1999 (JP) ............................................ 11-308390
Sep. 26, 2000 (JP) ...................................... 2000-291686

(51) Int. Cl.$^7$ .............................................. G02B 15/14
(52) U.S. Cl. ...................................... 359/683; 359/687
(58) Field of Search ................................. 359/683, 687

(56) References Cited

U.S. PATENT DOCUMENTS

| | | | |
|---|---|---|---|
| 4,859,042 A | 8/1989 | Tanaka | 350/423 |
| 5,100,223 A | 3/1992 | Ono et al. | 359/683 |
| 5,134,524 A | 7/1992 | Hamano et al. | 359/687 |
| 5,138,492 A | 8/1992 | Hamano et al. | 359/684 |
| 5,359,457 A | 10/1994 | Saka et al. | 359/684 |
| 5,430,576 A | 7/1995 | Hamano | 359/684 |
| 5,543,970 A | 8/1996 | Hata et al. | 359/690 |
| 5,546,231 A | 8/1996 | Sato | 359/687 |
| 5,583,697 A | 12/1996 | Mukaiya | 359/687 |
| 5,612,825 A | 3/1997 | Horiuchi et al. | 359/687 |
| 5,712,733 A | 1/1998 | Mukaiya | 359/687 |
| 5,751,496 A | 5/1998 | Hamano | 359/677 |
| 5,754,346 A | 5/1998 | Nakayama et al. | 359/687 |
| 5,818,646 A | 10/1998 | Hamano | 359/684 |

Primary Examiner—Scott J. Sugarman
(74) Attorney, Agent, or Firm—Sidley Austin Brown & Wood LLP

(57) ABSTRACT

Taking lens apparatus has zoom lens system, focusing light from object to form optical image, and image-sensing device, converting optical image into electric signal. Lens system has: first lens unit having a positive optical power, composed of three or fewer lens elements including at least one negative lens element and at least one positive lens element; second lens unit having negative optical power and moving to be on image-plane side of its position in shortest-focal-length condition; and one or more succeeding lens units. This system varies magnification by varying distances between lens units, and fulfills 0.92<FW/IH<1.85, ND<1.53, and VD>78, where FW represents focal length of lens system in shortest-focal-length condition, IH represents maximum image height, ND represents refractive index for d line of positive lens element included in first lens unit, and VD represents Abbe number for d line of same positive lens element.

17 Claims, 13 Drawing Sheets

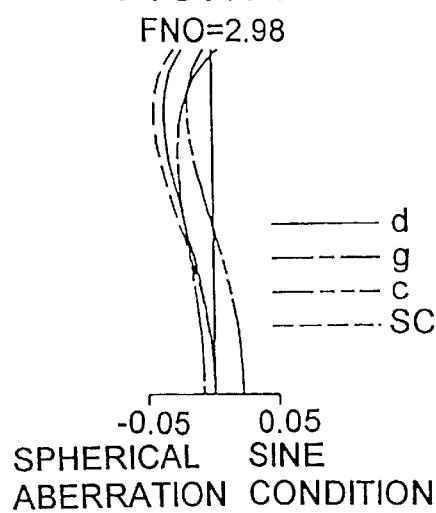
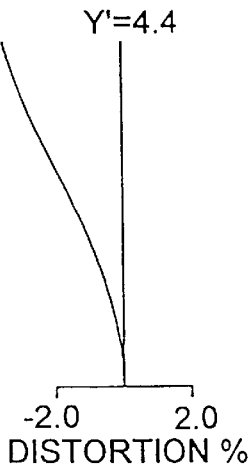
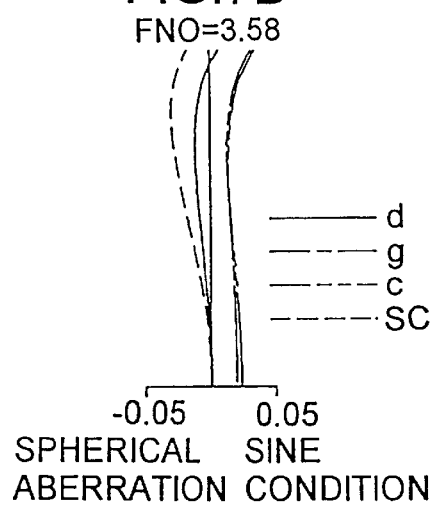
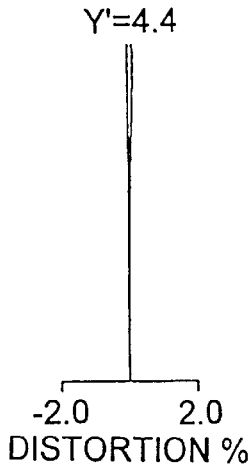
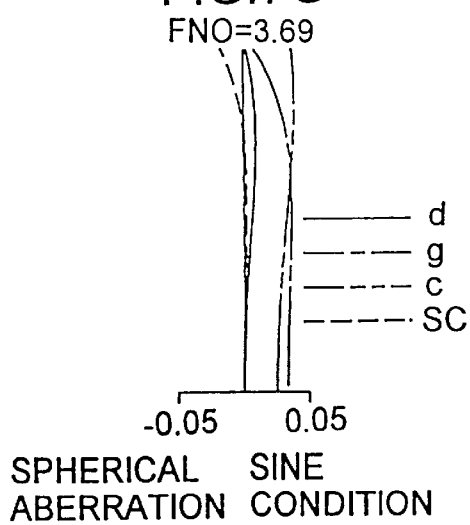
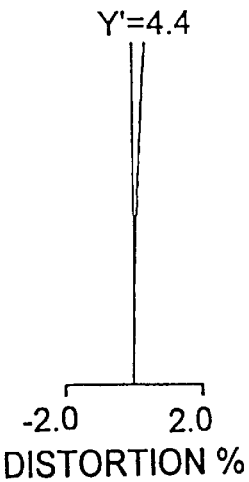

FNO=2.91

— d
— — g
— — — c
— - - SC

-0.05   0.05
SPHERICAL   SINE
ABERRATION  CONDITION

Y'=3.0

- - - - DM
——— DS

-0.05   0.05
ASTIGMATISM

Y'=3.0

-2.0   2.0
DISTORTION %

FNO=3.42

— d
— — g
— — — c
— - - SC

-0.05   0.05
SPHERICAL   SINE
ABERRATION  CONDITION

Y'=3.0

- - - - DM
——— DS

-0.05   0.05
ASTIGMATISM

Y'=3.0

-2.0   2.0
DISTORTION %

FNO=3.69

— d
— — g
— — — c
— - - SC

-0.05   0.05
SPHERICAL   SINE
ABERRATION  CONDITION

Y'=3.0

- - - - DM
——— DS

-0.05   0.05
ASTIGMATISM

Y'=3.0

-2.0   2.0
DISTORTION %

FNO=2.33

— d
--- g
--- c
---- SC

-0.05   0.05
SPHERICAL   SINE
ABERRATION   CONDITION

Y'=5.2

---- DM
—— DS

-0.05   0.05
ASTIGMATISM

Y'=5.2

-2.0   2.0
DISTORTION %

FNO=3.00

— d
--- g
--- c
---- SC

-0.05   0.05
SPHERICAL   SINE
ABERRATION   CONDITION

Y'=5.2

---- DM
—— DS

-0.05   0.05
ASTIGMATISM

Y'=5.2

-2.0   2.0
DISTORTION %

FNO=3.70

— d
--- g
--- c
---- SC

-0.05   0.05
SPHERICAL   SINE
ABERRATION   CONDITION

Y'=5.2

---- DM
—— DS

-0.05   0.05
ASTIGMATISM

Y'=5.2

-2.0   2.0
DISTORTION %

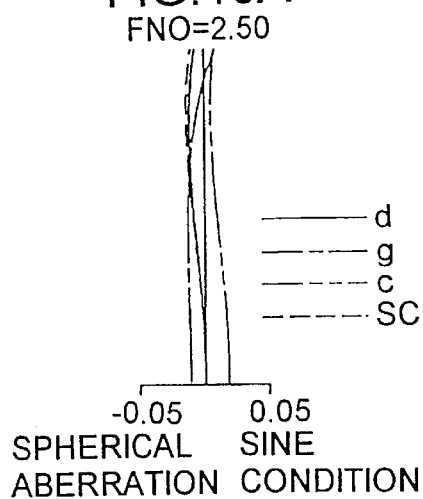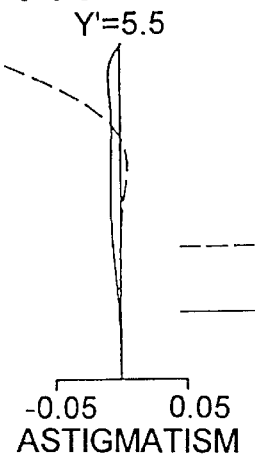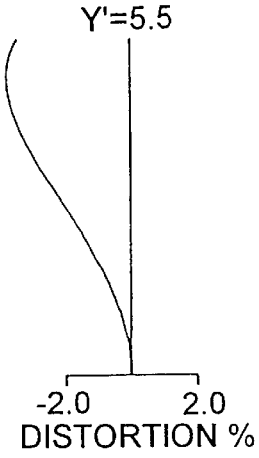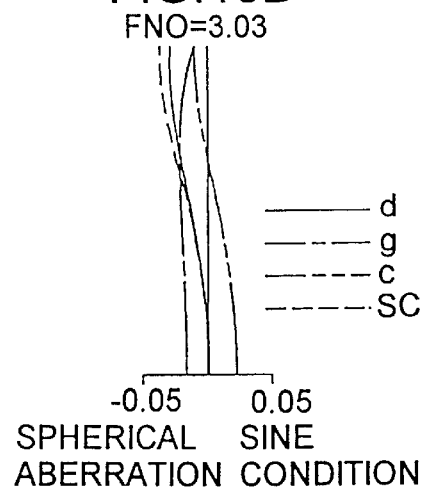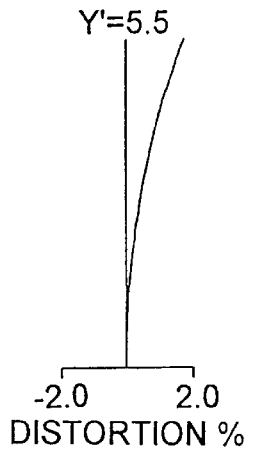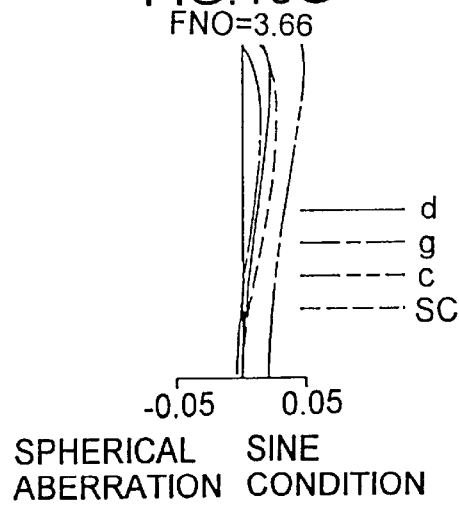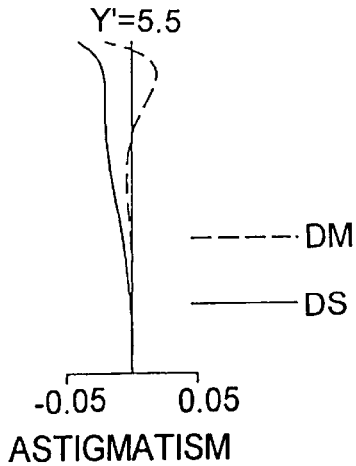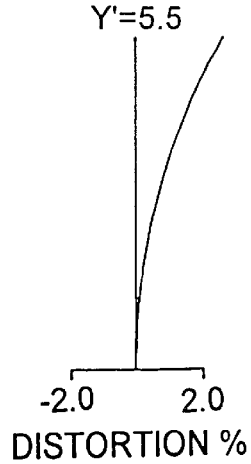

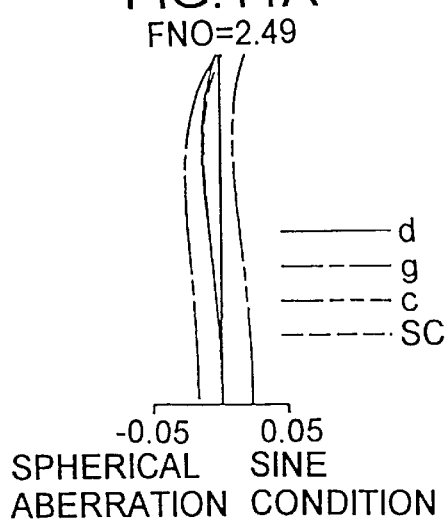
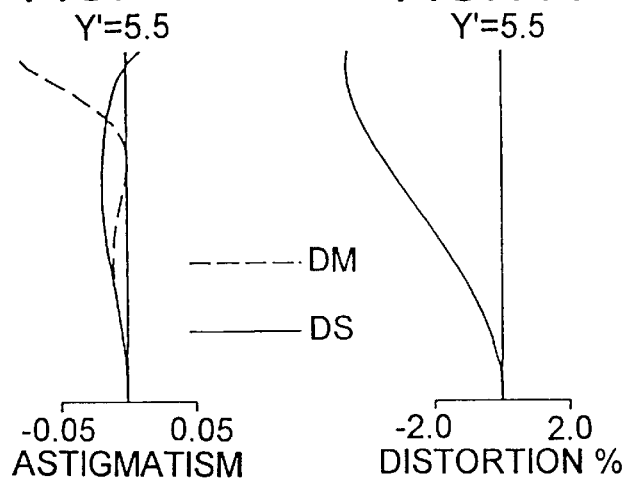
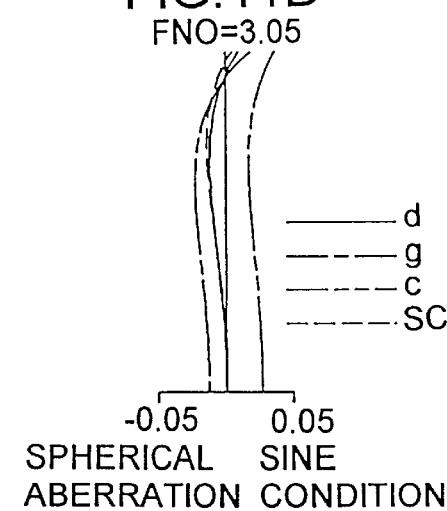
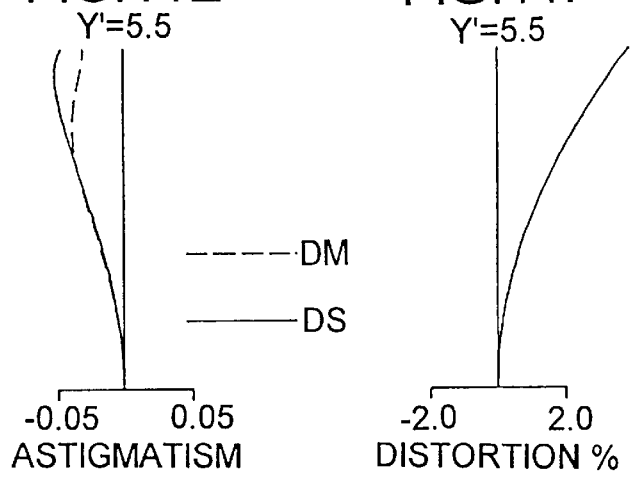
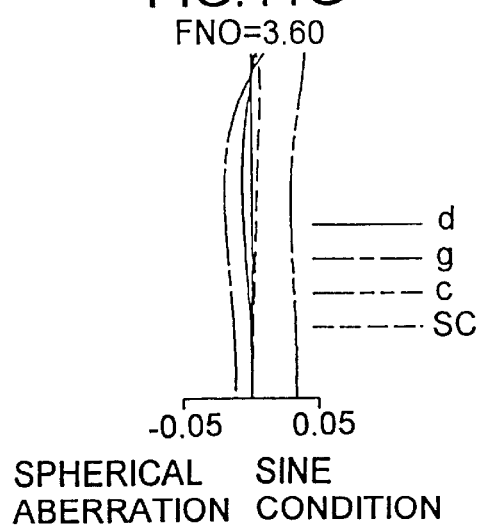
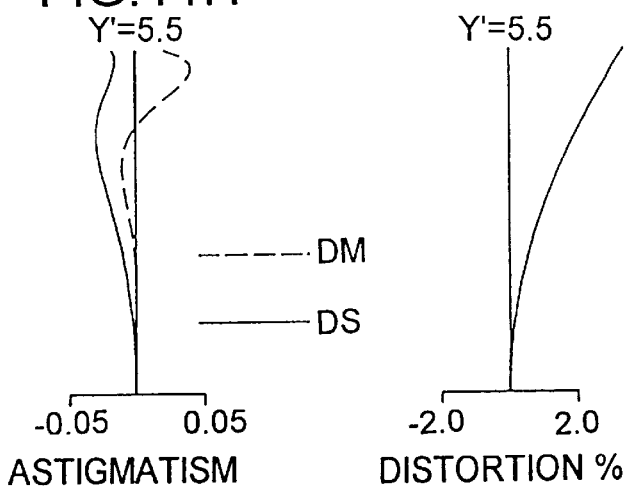

FNO=2.68

—— d
-- - g
----- SC

-0.05  0.05
SPHERICAL SINE
ABERRATION CONDITION

Y'=3.3

----- DM
—— DS

-0.05  0.05
ASTIGMATISM

Y'=3.3

-2.0  2.0
DISTORTION %

FNO=2.99

—— d
-- - g
----- SC

-0.05  0.05
SPHERICAL SINE
ABERRATION CONDITION

Y'=3.3

----- DM
—— DS

-0.05  0.05
ASTIGMATISM

Y'=3.3

-2.0  2.0
DISTORTION %

FNO=3.60

—— d
-- - g
----- SC

-0.05  0.05
SPHERICAL SINE
ABERRATION CONDITION

Y'=3.3

----- DM
—— DS

-0.05  0.05
ASTIGMATISM

Y'=3.3

-2.0  2.0
DISTORTION %

TAKING LENS APPARATUS

This application is based on applications Nos. H11-308390 and 2000-291686 filed in Japan on Oct. 29, 1999 and Sep. 26, 2000, respectively, the entire contents of which are hereby incorporated by reference.

BACKGROUND OF THE INVENTION

1. Field of the Invention

The present invention relates to a taking lens apparatus, and particularly to a taking lens apparatus that optically takes in an image of a subject through an optical system and that outputs the image as an electric signal by means of an image-sensing device (i.e. a taking lens apparatus for use as the principal component of a digital camera, video camera, or camera built in or externally fitted to a personal computer, mobile computer, portable telephone, personal digital assistant (PDA), or the like), and more particularly to a taking lens apparatus provided with a compact high-zoom-ratio zoom lens system.

2. Description of the Prior Art

In recent years, as personal computers become more and more popular, digital still cameras, which permit easy acquisition of images, have been becoming increasingly popular. As digital still cameras become more and more popular, models offering increasingly high zoom ratios are sought after, and accordingly there is a growing demand for increasingly compact and high-zoom-ratio taking lens systems. On the other hand, as image-sensing devices with more and more pixels are developed, increasingly high-performance taking lens systems are sought after.

However, no known conventional zoom lens system satisfactorily meets these conflicting requirements of compactness and a high zoom ratio combined with high optical performance.

SUMMARY OF THE INVENTION

An object of the present invention is to provide a taking lens apparatus provided with a compact, high-zoom-ratio, but nevertheless high-performance zoom lens system.

To achieve the above object, according to one aspect of the present invention, a taking lens apparatus is provided with: a zoom lens system for focusing the light from an object so as to form an optical image; and an image-sensing device for converting the optical image formed by the zoom lens system into an electric signal. Here, the zoom lens system is provided with, from the object side: a first lens unit having a positive optical power and composed of three or fewer lens elements in total including at least one negative lens element and at least one positive lens element; a second lens unit having a negative optical power and moving, during zooming, in such a way as to be located always on the image-plane side of the position in which the second lens unit is located in the shortest-focal-length condition; and one or more succeeding lens units. This zoom lens system permits the magnification to be varied by varying the distances between the lens units, and fulfills the following conditions:

0.92<FW/IH<1.85;

ND<1.53; and

VD>78, where FW represents the focal length of the zoom lens system in the shortest-focal-length condition; IH represents the maximum image height; ND represents the refractive index for the d line of the positive lens element mentioned above as at least one included in the first lens unit; and VD represents the Abbe number for the d line of the positive lens element mentioned above as at least one included in the first lens unit.

According to another aspect of the present invention, a taking lens apparatus is provided with: a zoom lens system for focusing the light from an object so as to form an optical image; an image-sensing device for converting the optical image formed by the zoom lens system into an electric signal; and an optical low-pass filter, disposed in the optical path on the object side of the image-sensing device, for optically controlling a predetermined spatial frequency component included in the optical image formed by the zoom lens system. Here, the zoom lens system is provided with, from the object side: a first lens unit having a positive optical power and composed of three or fewer lens elements in total including at least one negative lens element and at least one positive lens element; a second lens unit having a negative optical power and moving, during zooming, in such a way as to be located always on the image-plane side of the position in which the second lens unit is located in the shortest-focal-length condition; and one or more succeeding lens units. This zoom lens system permits the magnification to be varied by varying the distances between those lens units, and fulfills the following conditions:

0.92<FW/IH<1.85;

ND<1.53; and

VD>78, where FW represents the focal length of the zoom lens system in the shortest-focal-length condition; IH represents the maximum image height; ND represents the refractive index for the d line of the positive lens element mentioned above as at least one included in the first lens unit; and VI) represents the Abbe number for the d line of the positive lens element mentioned above as at least one included in the first lens unit.

BRIEF DESCRIPTION OF THE DRAWINGS

This and other objects and features of the present invention will become clear from the following description, taken in conjunction with the preferred embodiments with reference to the accompanying drawings in which:

FIGS. 7A to 7I are diagrams showing the aberrations observed in Example 1;

FIGS. 10A to 10I are diagrams showing the aberrations observed in Example 4;

FIGS. 11A to 11I are diagrams showing the aberrations observed in Example 5;

DESCRIPTION OF THE PREFERRED EMBODIMENTS

Figure 13:
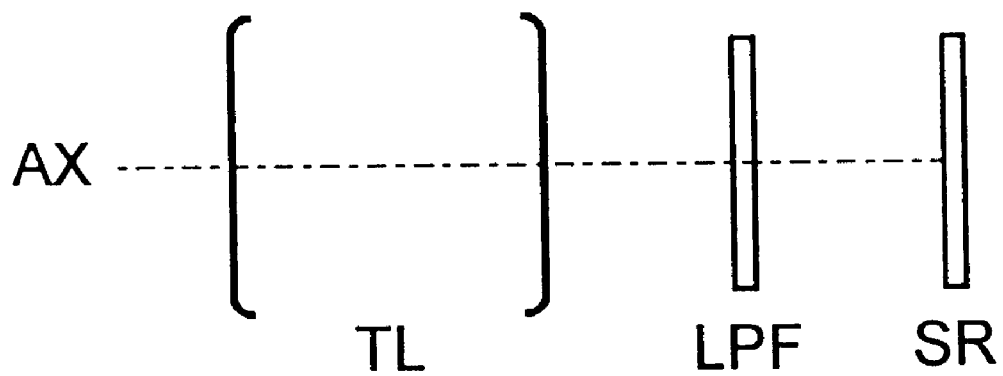
FIG. 13 is a schematic diagram illustrating the outline of the optical construction of a taking lens apparatus embodying the invention.

Hereinafter, taking lens apparatuses embodying the present invention will be described with reference to the drawings. A taking lens apparatus takes in an image of a subject optically, and outputs it as an electric signal. Taking lens apparatuses are used as a principal component in cameras for taking still or moving pictures of a subject (for example, digital cameras, video cameras, and cameras built in or externally fitted to personal computers, mobile computers, portable telephones, personal digital assistants (PDAs) and the like). For example, as shown in FIG. 13, a taking lens apparatus is composed of, from the object (i.e. the subject to be shot) side, a taking lens system (TL) for forming an optical image of the object, a plane-parallel plate (LPF) serving as a low-pass filter or the like, and an image-sensing device (SR) for converting the optical image formed by the taking lens system (TL) into an electric signal.

All of the embodiments described hereinafter employ as the taking lens system (TL) a zoom lens system composed of a plurality of lens units. This zoom lens system is so constructed that at least two of its constituent lens units can move along the optical axis (AX) in such a way as to vary the distances between the individual lens units and thereby vary the magnification. As the image-sensing device (SR), for example, a solid-state image-sensing device such as a CCD (charge-coupled device) or CMOS (complementary metal-oxide semiconductor) having a plurality of pixels is used, by which the optical image formed by the zoom lens system is converted into an electric signal. The optical image to be formed by the zoom lens system is passed through the optical low-pass filter (LPF), which has a predetermined cut-off frequency characteristic determined by the pixel pitch of the image-sensing device. This helps adjust the spatial frequency characteristics of the optical image in such a way as to minimize so-called turning noise that occurs when the optical image is converted into an electric signal. The electric signal produced by the image-sensing device (SR) is subjected to predetermined digital image processing, image compression processing, or other as required, and is then recorded as a digital image signal on a storage device (such as a semiconductor memory or optical disk) or, depending on applications, transmitted to an external device by way of a cable or after being converted into an infrared signal.

FIGS. 1 to 6 are lens construction diagrams of the zoom lens system employed in a first to a sixth embodiment, respectively, of the invention, each illustrating the lens arrangement at the wide-angle end [W] (i.e. in the shortest-focal-length condition). In each lens construction diagram, an arrow mj (j=1, 2, . . . ) schematically indicates the movement of the j-th lens unit (Grj) during zooming from the wide-angle end [W] to the telephoto end [T] (i.e. the longest-focal-length condition). Moreover, in each lens construction diagram, ri (i=1, 2, 3, . . . ) indicates the i-th surface as counted from the object side, and a surface ri marked with an asterisk (*) is an aspherical surface; di (i=1, 2, 3, . . . ) indicates the i-th axial distance as counted from the object side, though only those which vary with zooming are shown here.

In all the embodiments, the zoom lens system is composed of, from the object side, a first lens unit (Gr1) having a positive optical power, a second lens unit (Gr2) having a negative optical power, and at least one succeeding lens unit (Gr3, . . . ) that follows them. During zooming from the wide-angle end [W] to the telephoto end [T], the second lens unit (Gr2) moves in such a way as to be located always on the image-plane side of the position where it is located at the wide-angle end [W]. This causes the distances between the individual lens units to vary and thereby causes the magnification to vary. Since this zoom lens system is designed for use in a camera (for example, a digital still camera) provided with a solid-state image-sensing device (for example, a CCD), on the image-plane side thereof is disposed the plane-parallel plate (LPF), which is made of glass and serves as a low-pass filter or the like. In all the embodiments, the first lens unit (Gr1) is composed of three or fewer lens elements in total including at least one negative lens element and at least one positive lens element, and the third lens unit (Gr3) includes an aperture stop (SP) at the object-side end thereof. The lens construction of each embodiment will be described in detail below.

Figure 1:
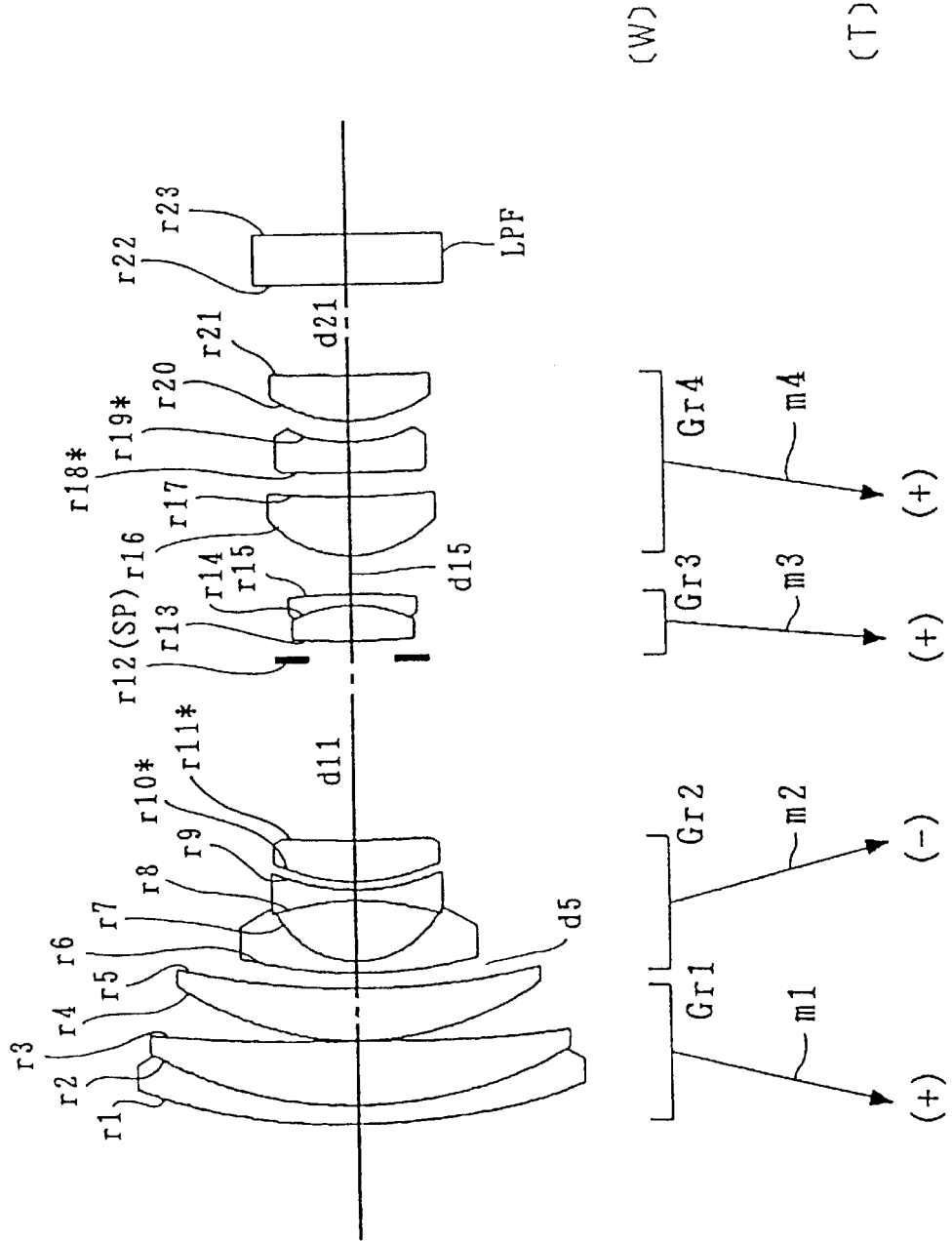
FIG. 1 is a lens construction diagram of a first embodiment (Example 1) of the invention.

First Embodiment (FIG. 1, positive-negative-positive-positive)

In the first embodiment, the zoom lens system is a four-lens-unit type of a positive-negative-positive-positive construction. Each lens unit is composed of optical elements that are arranged, from the object side, as follows. The first lens unit (Gr1) is composed of a cemented lens element consisting of a negative meniscus lens element concave to the image-plane side and a positive meniscus lens element convex to the object side cemented together, and a positive meniscus lens element convex to the object side. The second lens unit (Gr2) is composed of a negative meniscus lens element concave to the image-plane side, a biconcave negative lens element, and a positive meniscus lens element convex to the object side (having aspherical surfaces on both sides). The third lens unit (Gr3) is composed of an aperture stop (SP) and a cemented lens element consisting of a biconvex positive lens element and a negative meniscus lens element concave to the object side cemented together. The fourth lens unit (Gr4) is composed of a positive meniscus lens element convex to the object side, a biconcave negative lens element (having aspherical surfaces on both sides), and a positive meniscus lens element convex to the object side. During zooming, all these lens units move for zooming.

Figure 2:
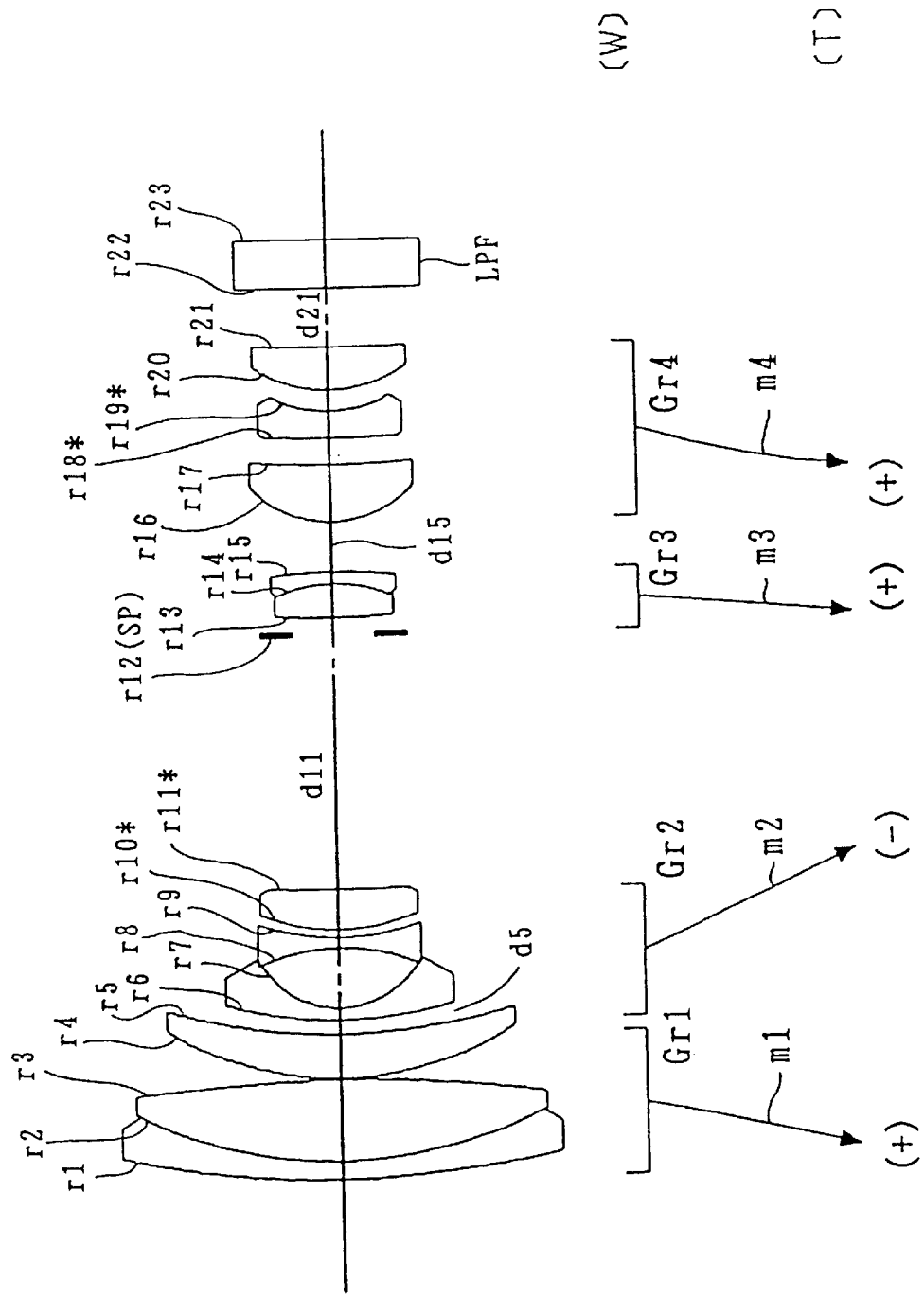
FIG. 2 is a lens construction diagram of a second embodiment (Example 2) of the invention.

Second Embodiment (FIG. 2, positive-negative-positive-positive)

In the second embodiment, the zoom lens system is a four-lens-unit type of a positive-negative-positive-positive construction. Each lens unit is composed of optical elements that are arranged, from the object side, as follows. The first lens unit (Gr1) is composed of a cemented lens element consisting of a negative meniscus lens element concave to the image-plane side and a biconvex positive lens element cemented together, and a positive meniscus lens element convex to the object side. The second lens unit (Gr2) is composed of a negative meniscus lens element concave to the image-plane side, a biconcave negative lens element, and a positive meniscus lens element convex to the object side (having aspherical surfaces on both sides). The third lens unit (Gr3) is composed of an aperture stop (SP) and a cemented lens element consisting of a biconvex positive lens element and a negative meniscus lens element concave to the object side cemented together. The fourth lens unit (Gr4) is composed of a positive meniscus lens element convex to the object side, a negative meniscus lens element concave to the image-plane side (having aspherical surfaces on both sides), and a positive meniscus lens element convex to the object side. During zooming, all these lens units move for zooming.

Figure 3:
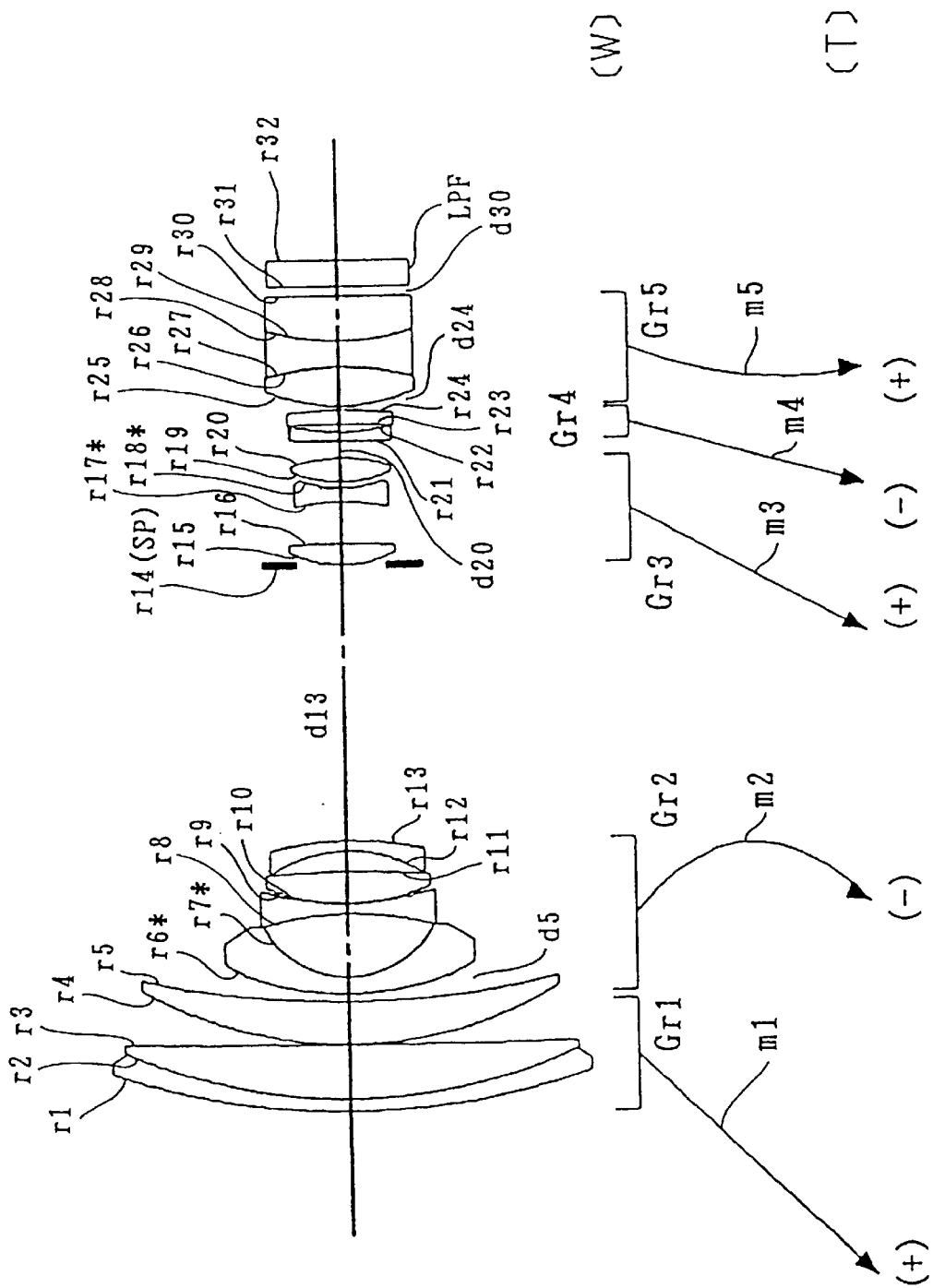
FIG. 3 is a lens construction diagram of a third embodiment (Example 3) of the invention.

Third Embodiment (FIG. 3, positive-negative-positive-negative-positive)

In the third embodiment, the zoom lens system is a five-lens-unit type of a positive-negative-positive-negative-positive construction. Each lens unit is composed of optical elements that are arranged, from the object side, as follows. The first lens unit (Gr1) is composed of a cemented lens element consisting of a negative meniscus lens element concave to the image-plane side and a positive meniscus lens element convex to the object side cemented together, and a positive meniscus lens element convex to the object side. The second lens unit (Gr2) is composed of a negative meniscus lens element concave to the image-plane side (having aspherical surfaces on both sides), a biconcave negative lens element, a biconvex positive lens element, and a negative meniscus lens element concave to the object side. The third lens unit (Gr3) is composed of an aperture stop (SP), a biconvex positive lens element, a biconcave negative lens element (having aspherical surfaces on both sides), and a biconvex positive lens element. The fourth lens unit (Gr4) is composed of a negative meniscus lens element concave to the image-plane side and a positive meniscus lens element convex to the image-plane side. The fifth lens unit (Gr5) is composed of a biconvex positive lens element, a biconcave negative lens element, and a positive meniscus lens element convex to the object side. During zooming, all these lens units move for zooming.

Figure 4:
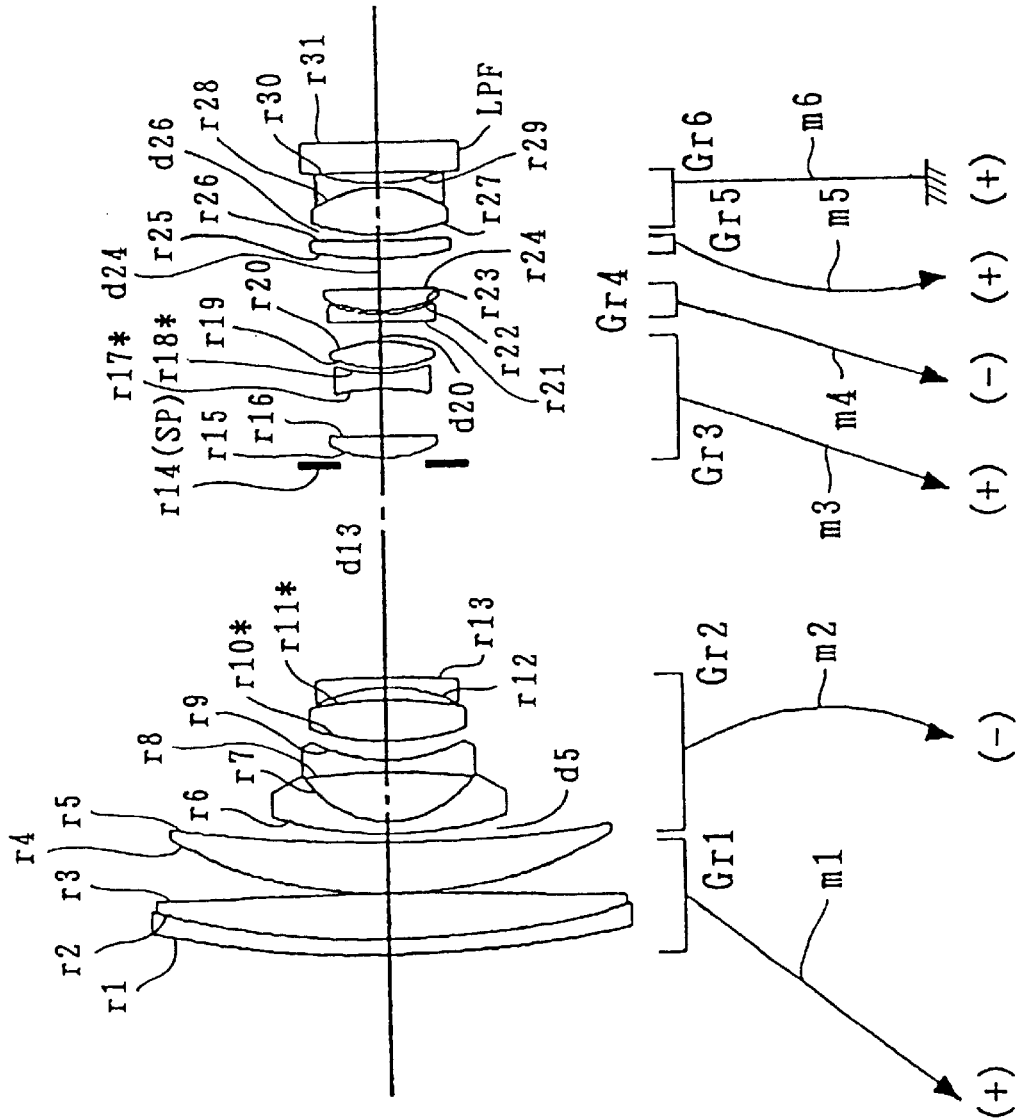
FIG. 4 is a lens construction diagram of a fourth embodiment (Example 4) of the invention.

Fourth Embodiment (FIG. 4, positive-negative-positive-negative-positive-positive)

In the fourth embodiment, the zoom lens system is a six-lens-unit type of a positive-negative-positive-negative-positive-positive construction. Each lens unit is composed of optical elements that are arranged, from the object side, as follows. The first lens unit (Gr1) is composed of a cemented lens element consisting of a negative meniscus lens element concave to the image-plane side and a biconvex positive lens element cemented together, and a positive meniscus lens element convex to the object side. The second lens unit (Gr2) is composed of a negative meniscus lens element concave to the image-plane side, a biconcave negative lens element, a biconvex positive lens element (having aspherical surfaces on both sides), and a negative meniscus lens element concave to the object side. The third lens unit (Gr3) is composed of an aperture stop (SP), a positive meniscus lens element convex to the object side, a biconcave negative lens element (having aspherical surfaces on both sides), and a biconvex positive lens element. The fourth lens unit (Gr4) is composed of a biconcave negative lens element and a positive meniscus lens element convex to the object side. The fifth lens unit (Gr5) is composed of a positive meniscus lens element convex to the object side. The sixth lens unit (Gr6) is composed of a cemented lens element consisting of a biconvex positive lens element and a biconcave negative lens element cemented together. During zooming, whereas the first to fifth lens units (Gr1 to Gr5) move for zooming, the sixth, i.e. last, lens unit (Gr6), as well as the plane-parallel plate (LPF), remains in a fixed position.

Figure 5:
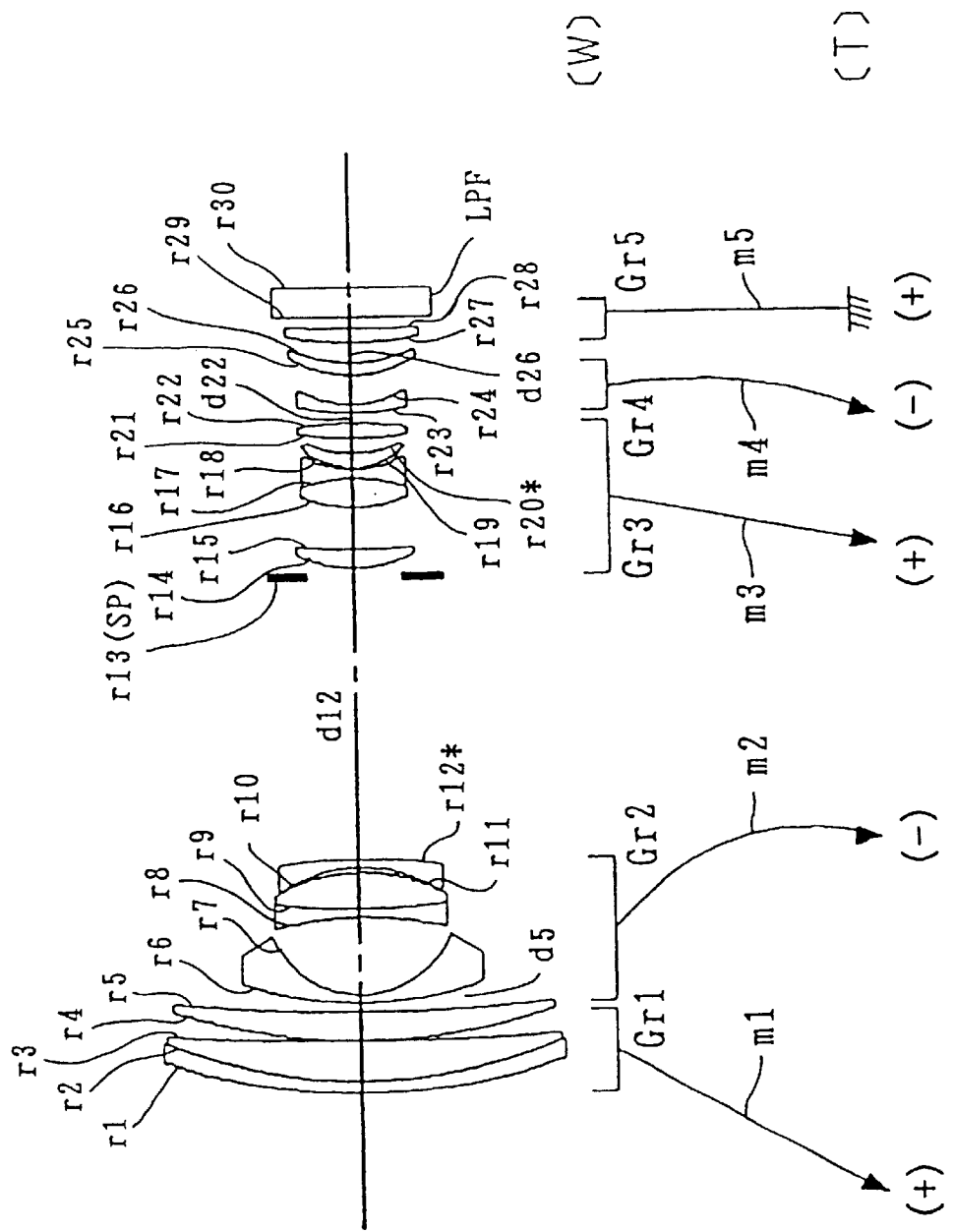
FIG. 5 is a lens construction diagram of a fifth embodiment (Example 5) of the invention.

Fifth Embodiment (FIG. 5, positive-negative-positive-negative-positive)

In the fifth embodiment, the zoom lens system is a five-lens-unit type of a positive-negative-positive-negative-positive construction. Each lens unit is composed of optical elements that are arranged, from the object side, as follows. The first lens unit (Gr1) is composed of a cemented lens element consisting of a negative meniscus lens element concave to the image-plane side and a positive meniscus lens element convex to the object side cemented together, and a positive meniscus lens element convex to the object side. The second lens unit (Gr2) is composed of a cemented lens element consisting of a negative meniscus lens element concave to the image-plane side, a biconcave negative lens element, and a biconvex positive lens element cemented together, and a negative meniscus lens element concave to the object side (having an aspherical surface on the image-plane side). The third lens unit (Gr3) is composed of an aperture stop (SP), a cemented lens element consisting of a positive meniscus lens element convex to the object side, a biconvex positive lens element, and a biconcave negative lens element cemented together, a positive meniscus lens element convex to the object side (having an aspherical surface on the image-plane side), and a biconvex positive lens element. The fourth lens unit (Gr4) is composed of a negative meniscus lens element concave to the image-plane side and a positive meniscus lens element convex to the object side. The fifth lens unit (Gr5) is composed of a positive meniscus lens element convex to the object side. During zooming, whereas the first to fourth lens units (Gr1 to Gr4) move for zooming, the fifth, i.e. last, lens unit (Gr5), as well as the plane-parallel plate (LPF), remains in a fixed position.

Figure 6:
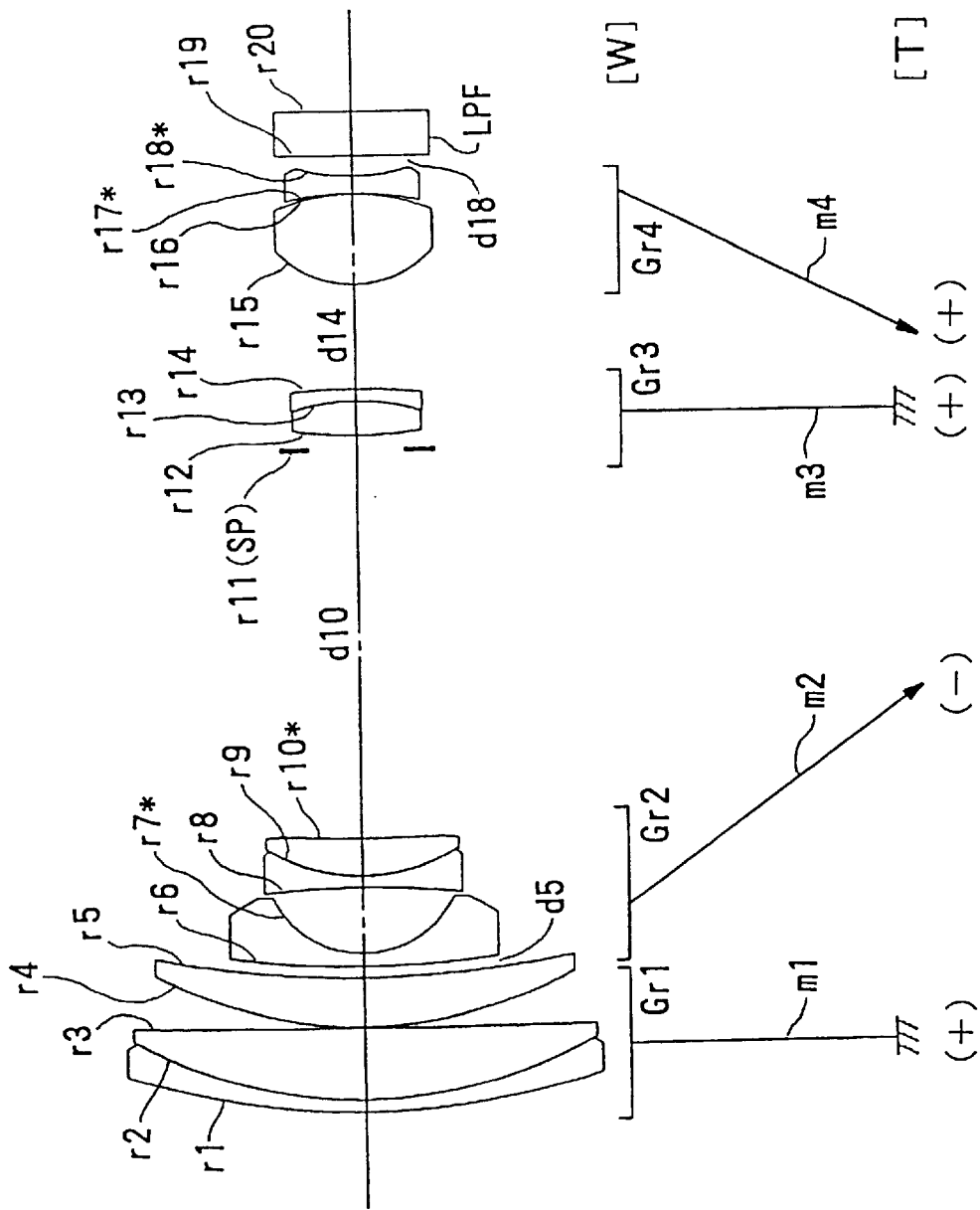
FIG. 6 is a lens construction diagram of a sixth embodiment (Example 6) of the invention.
Figure 8A:
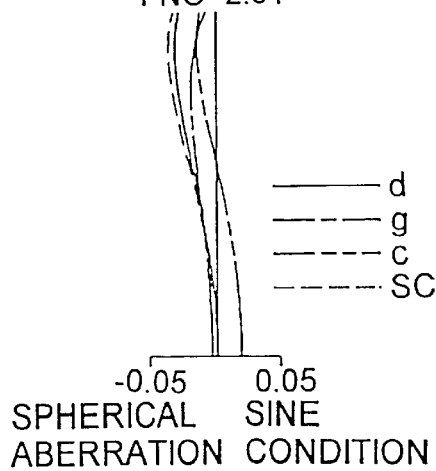
FIGS. 8A to 8I are diagrams showing the aberrations observed in Example 2.
Figure 8B:
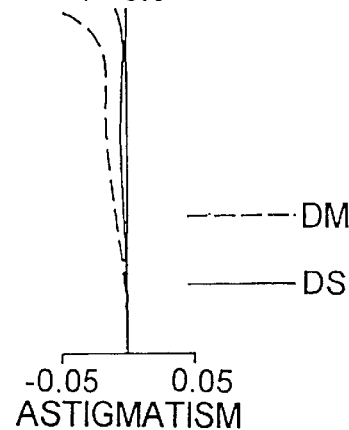
Figure 8C:
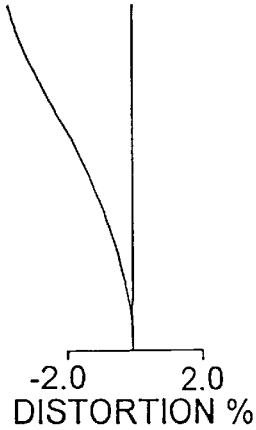
Figure 8D:
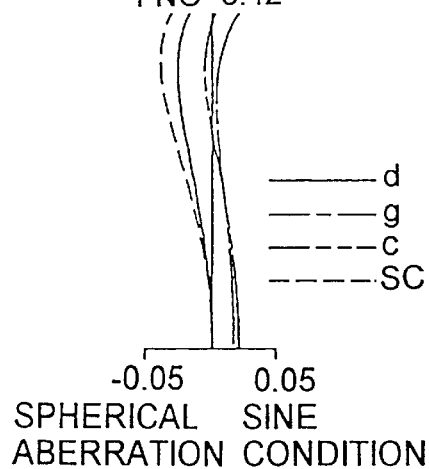
Figure 8E:
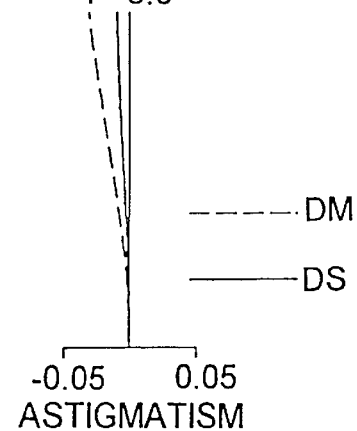
Figure 8F:
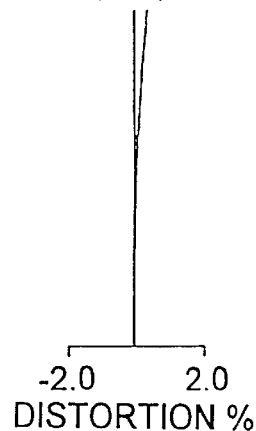
Figure 8G:
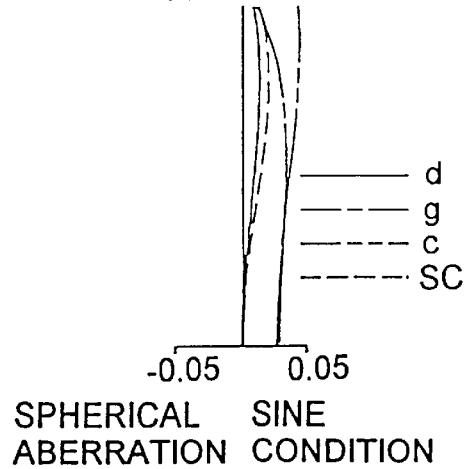
Figure 8H:
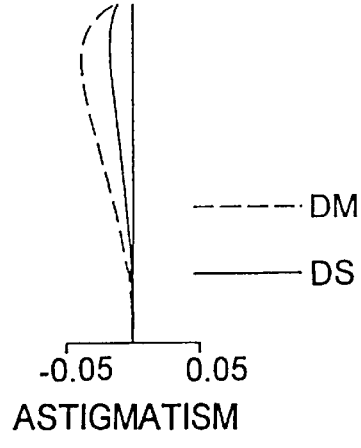
Figure 8I:
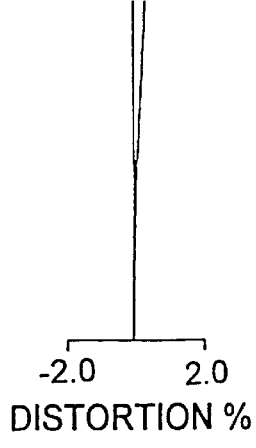
Figure 9A:
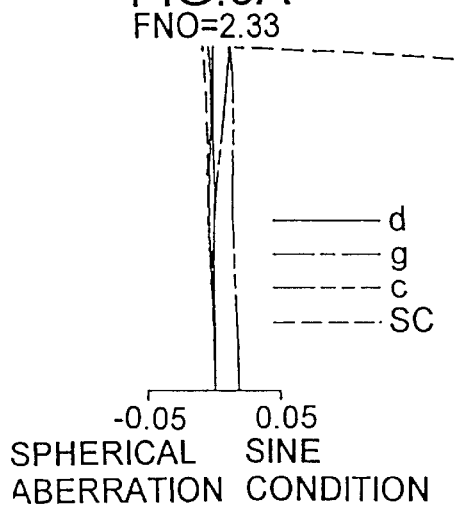
FIGS. 9A to 9I are diagrams showing the aberrations observed in Example 3.
Figure 9B:
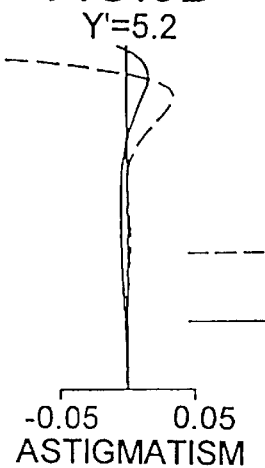
Figure 9C:
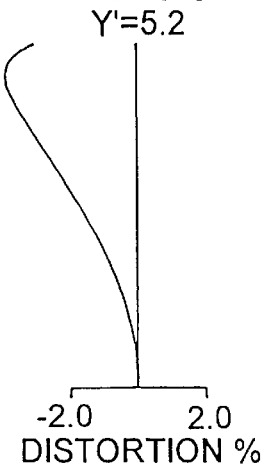
Figure 9D:
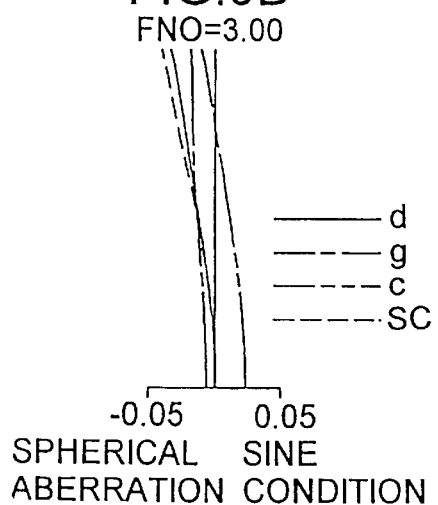
Figure 9E:
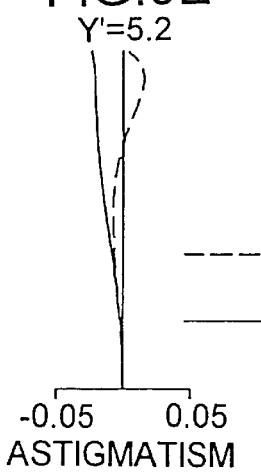
Figure 9F:
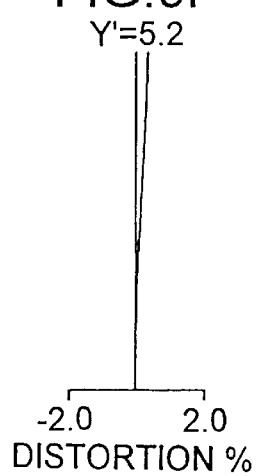
Figure 9G:
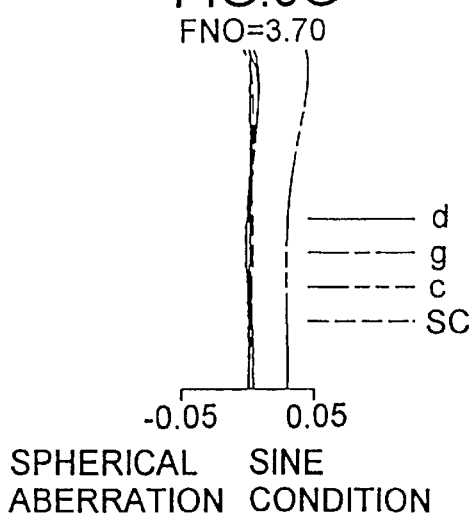
Figure 9H:
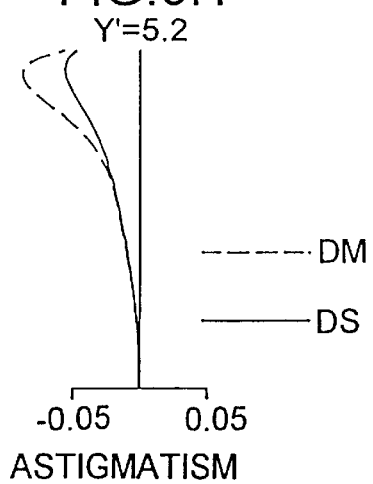
Figure 9I:
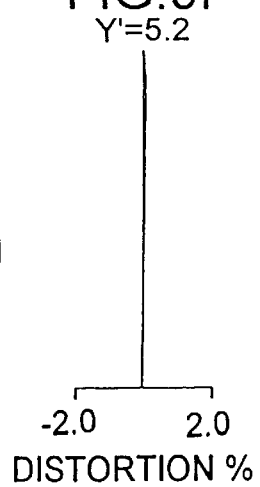
Figure 12A:
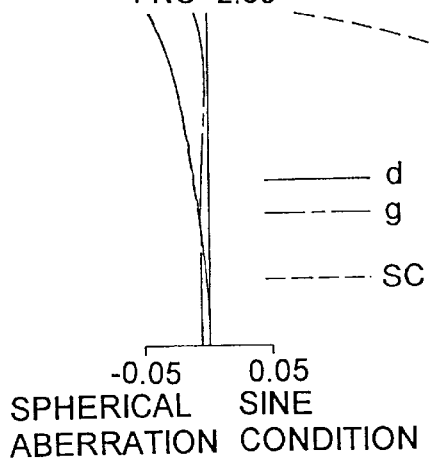
FIGS. 12A to 12I are diagrams showing the aberrations observed in Example 6.
Figure 12B:
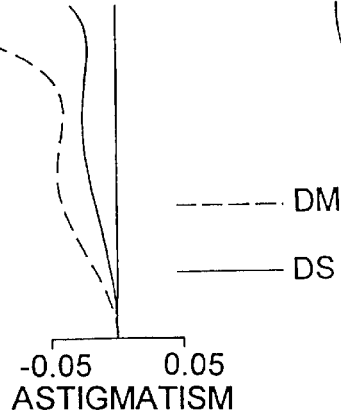
Figure 12C:
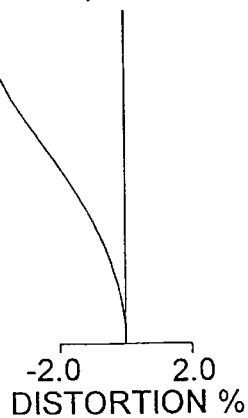
Figure 12D:
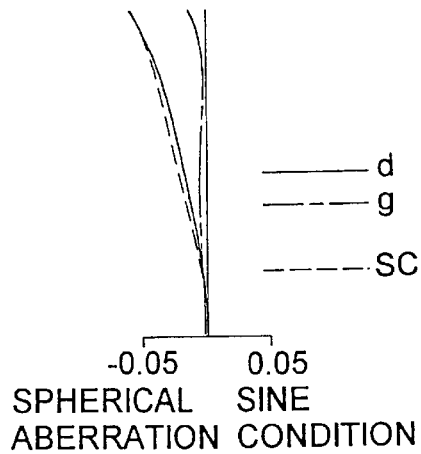
Figure 12E:
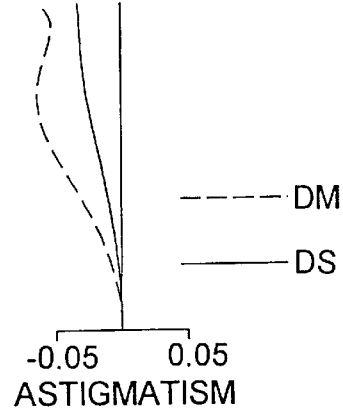
Figure 12F:
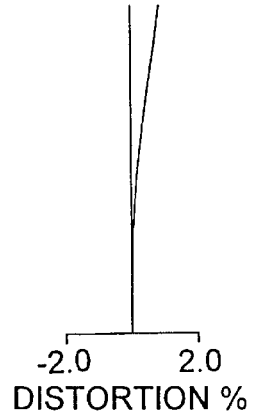
Figure 12G:
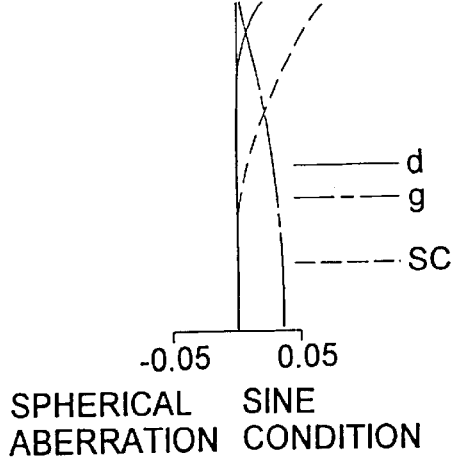
Figure 12H:
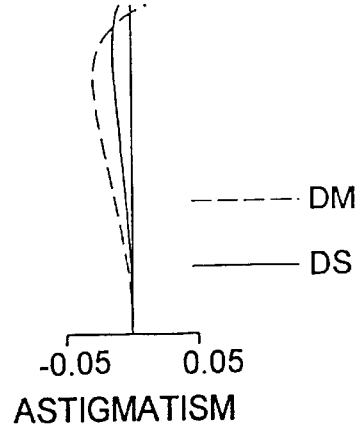
Figure 12I:
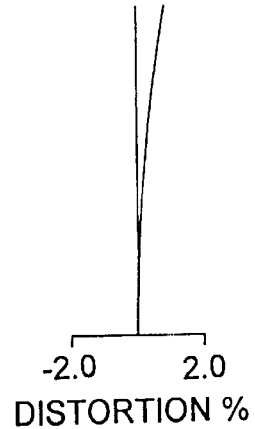

Sixth Embodiment (FIG. 6, positive-negative-positive-positive)

In the sixth embodiment, the zoom lens system is a four-lens-unit type of a positive-negative-positive-positive construction. Each lens unit is composed of optical elements that are arranged, from the object side, as follows. The first lens unit (Gr1) is composed of a cemented lens element consisting of a negative meniscus lens element concave to the image-plane side and a positive meniscus lens element convex to the object side cemented together, and a positive meniscus lens element convex to the object side. The second lens unit (Gr2) is composed of a negative meniscus lens element concave to the image-plane side (having an aspherical surface on the image-plane side), and a cemented lens element consisting of a biconcave negative lens element and a positive meniscus lens element convex to the object side (having an aspherical surface on the image-plane side) cemented together. The third lens unit (Gr3) is composed of an aperture stop (SP) and a cemented lens element consisting of a biconvex positive lens element and a negative meniscus lens element concave to the object side cemented together. The fourth lens unit (Gr4) is composed of a biconvex positive lens element and a biconcave negative lens element (having aspherical surfaces on both sides). During zooming, whereas the second and fourth lens units (Gr2 and Gr4) move for zooming, the first and third lens units (Gr1 and Gr3) remain in fixed positions.

In all the embodiments described above, during zooming from the wide-angle end [W] to the telephoto end [T], the second lens unit (Gr2) moves in such a way as to be located always on the image-plane side of the position where it is located at the wide-angle end [W]. Thus, at the wide-angle end [W], the second lens unit (Gr2) is located in the most object-side position throughout the entire zoom range. Such movement of the second lens unit (Gr2) is peculiar to a camera (for example, a digital still camera) provided with a solid-state image-sensing device (for example, a CCD). Designed for such application, the zoom lens system here should preferably fulfill the conditions that will be described below. It is to be noted that even fulfilling those conditions singly helps achieve the effects corresponding to the fulfilled conditions but, needless to say, fulfilling as many of them as possible is preferable for best results in terms of optical performance, compactness, and other aspects.

It is preferable that condition (1) noted below be fulfilled. If the lower limit of condition (1) is transgressed, the lens elements that are disposed at the front need to be given unduly large diameters. This makes the camera unduly large, and in addition makes correction of distortion unduly difficult. By contrast, if the upper limit of condition (1) is transgressed, the zoom lens system comes to have an unduly long total length. This makes the camera unduly large.

$$0.92 < FW/IH < 1.85 \tag{1}$$

where

FW represents the focal length of the zoom lens system as a whole at the wide-angle end [W]; and IH represents the maximum image height.

It is preferable that conditions (2) and (3) noted below be fulfilled. Conditions (2) and (3) define the conditions that ensure effective use of anomalous dispersion glass in a zoom lens system designed for use in a camera provided with a solid-state image-sensing device. If the upper limit of condition (2) or the lower limit of condition (3) is transgressed, it is unduly difficult to correct lateral chromatic aberration, and thus it is unduly difficult to obtain satisfactory optical performance over the entire zoom range.

$$ND < 1.53 \tag{2}$$

$$VD > 78 \tag{3}$$

where

ND represents the refractive index for the d line of the positive lens element mentioned above as at least one included in the first lens unit (Gr1); and VD represents the Abbe number for the d line of the positive lens element mentioned above as at least one included in the first lens unit (Gr1).

It is preferable that, as in any of the embodiments described previously, the first lens unit (Gr1) be composed of three lens elements that are, from the object side, a negative lens element convex to the object side, a positive lens element convex to the object side, and a positive lens element convex to the object side. This lens arrangement is effective in properly correcting various aberrations with the first lens unit (Gr1), and is effective also in reducing the total length of the zoom lens system.

It is preferable that, as in any of the embodiments described previously, the third lens unit (Gr3) be given a positive optical power. Giving the third lens unit (Gr3) a positive optical power permits the light beam that has been made to diverge by the second lens unit (Gr2) to be made to converge by the third lens unit (Gr3). This helps reduce the total length of the zoom lens system.

Generally, a solid-state image-sensing device (such as a CCD) designed for use in a digital still camera, video camera, or the like has microlenses provided individually in front of light-sensing elements in order to enhance their light-collecting ability. To make the most of the characteristics of the microlenses, it is essential to make a light beam incident thereon substantially parallel to the optical axes thereof (i.e. substantially perpendicularly to the light-sensing surface of the light-sensing elements). To achieve this, it is necessary to use a taking lens system that is so constructed as to be telecentric toward the image-plane side. From this perspective, it is preferable that, as in any of the embodiments described previously, the lens unit disposed at the image-plane-side end (i.e. the last lens unit) be given a positive optical power. Giving the last lens unit a positive optical power permits a light beam to be incident on the solid-state image-sensing device substantially perpendicularly to the light-sensing surface thereof. Thus, it is possible to make the most of the performance of the solid-state image-sensing device.

It is preferable that condition (4) noted below be fulfilled. If the lower limit of condition (4) is transgressed, the lens elements disposed at the front need to be given unduly large diameters. This makes the camera unduly large. By contrast, if the upper limit of condition (4) is transgressed, coma aberration becomes so large as to cause unduly large astigmatism.

$$0.06 < FW/F1 < 0.21 \tag{4}$$

where

FW represents the focal length of the zoom lens system as a whole at the wide-angle end [W]; and F1 represents the focal length of the first lens unit (Gr1).

It is preferable that, as in any of the embodiments described previously, in the first lens unit (Gr1), a negative lens element convex to the object side and a positive lens element convex to the object side be cemented together. Cementing these lens elements together helps simplify the shape of the lens frame and in addition reduce error-causing factors (that is, the errors attributable to the gap between the lenses can be minimized by cementing them together). This makes it easy to give the zoom lens system high optical performance.

It is preferable that, as in any of the embodiments described previously, the first lens unit (Gr1) move toward the object side during zooming from the wide-angle end [W] to the telephoto end [T]. Moving the first lens unit (Gr1) toward the object side permits the heights at which rays of light pass therethrough to vary with zooming. This makes it possible to distribute properly the burden of aberration correction among the lens units, and thus makes it easy to give the zoom lens system high optical performance.

It is preferable that, as in any of the embodiments described previously, the third lens unit (Gr3) move toward the object side during zooming from the wide-angle end [W] to the telephoto end [T]. Moving the third lens unit (Gr3) toward the object side helps alleviate the burden of aberration correction associated with zooming on the third lens unit (Gr3) and any lens unit succeeding it. This makes it easy to give the zoom lens system high optical performance.

It is preferable that condition (5) noted below be fulfilled. If the lower limit of condition (5) is transgressed, the third lens unit (Gr3) has too weak an optical power. This is advantageous to aberration correction, but requires an undue increase in the movement stroke of the third lens unit (Gr3). This makes the total length of the zoom lens system and the diameters of the lens elements disposed at the front unduly large. By contrast, if the upper limit of condition (5) is transgressed, the third lens unit (Gr3) has too strong an optical power. This is advantageous to reducing the total length of the zoom lens system, but makes the inclination of the image plane toward the over side unduly large.

$$0.12 < FW/F3 < 0.56 \tag{5}$$

where

FW represents the focal length of the zoom lens system as a whole at wide-angle end [W]; and F3 represents the focal length of the third lens unit (Gr3).

It is preferable that condition (6) noted below be fulfilled. If the lower limit of condition (6) is transgressed, coma aberration becomes so large as to cause unduly large high-order lateral chromatic aberration. By contrast, if the upper limit of condition (6) is transgressed, coma aberration becomes so large as to cause unduly large astigmatism.

$$0.03 < FW/FR < 0.55 \qquad (6)$$

where

FW represents the focal length of the zoom lens system as a whole at wide-angle end [W]; and FR represents the focal length of the lens unit disposed at the image-plane-side end.

In the first to sixth embodiments described hereinbefore, all the lens units are composed solely of refractive lens elements, i.e. lens elements that deflect the light incident thereon by refraction (in other words, lens elements in which deflection of light occurs at the interface surface between media having different refractive indices). However, these lens units may include one or more lens elements of any other type, e.g. diffractive lens elements that deflect the light incident thereon by diffraction, refractive/diffractive hybrid-type lens elements that deflect the light incident thereon by combined effect of diffraction and refraction, or gradient-index lens elements that deflect the light incident thereon by varying refractive indices distributed within a medium.

Moreover, in any of the embodiments described hereinbefore, a surface having no optical power (for example, a reflecting, refracting, or diffracting surface) may be disposed in the optical path so as to turn the optical path in front of, behind, or within the zoom lens system. Where to turn the optical path may be determined as required. Turning the optical path appropriately helps make the camera look slimmer. It is also possible even to realize a construction that keeps the thickness of the camera constant even when the zoom lens system performs zooming or when the zoom lens system is so constructed as to be collapsible. For example, by disposing a mirror behind the first lens unit (Gr1), which remains in a fixed position during zooming, in such a way that the reflecting surface of the mirror turns the optical path 90 degrees there, it is possible to keep the front-to-rear length of the zoom lens system fixed and thereby make the camera slimmer.

Furthermore, in any of the embodiments described hereinbefore, as the optical low-pass filter having the shape of a plane-parallel plate and disposed between the final surface of the zoom lens system and the image-sensing device, it is also possible to use a birefringence-type low-pass filter made of quartz or the like and having a predetermined crystal axis thereof aligned appropriately, a phase-type low-pass filter that exploits the effect of diffraction to achieve a desired optical cut-off frequency characteristic, or the like.

EXAMPLES

Hereinafter, practical examples of the construction of the zoom lens system employed in taking lens apparatuses embodying the present invention will be described with reference to their construction data and other data. Examples 1 to 6 described below correspond to the first to sixth embodiments, respectively, described previously, and therefore the lens arrangement diagrams (FIGS. 1 to 6), which show the lens construction of the first to sixth embodiments, also show the lens construction of Examples 1 to 6, respectively.

Tables 1 to 6 list the construction data of Examples 1 to 6, respectively. In the construction data of each example, ri (i=1, 2, 3, . . . ) represents the radius of curvature of the i-th surface as counted from the object side, di (i=1, 2, 3, . . . ) represents the i-th axial distance as counted from the object side, and Ni (i=1, 2, 3, . . . ) and vi (i=1, 2, 3, . . . ) respectively represent the refractive index (Nd) for the d line and the Abbe number (vd) of the i-th optical element as counted from the object side. In the construction data, for each of those axial distances that vary with zooming (i.e. variable axial distances), three values are listed, which are, from left, the axial distances as observed at the wide-angle end [W] (in the shortest-focal-length condition), at the middle [M] (in the middle-focal-length condition), and at the telephoto end [T] (in the longest-focal-length condition). Also listed are the focal length (f) and the f/number (FNO) of the zoom lens system as a whole as observed in each of the three focal length conditions [W], [M], and [T] mentioned just above. Table 7 lists the values of conditions (1) to (6) as actually observed in each example.

A surface whose radius of curvature ri is marked with an asterisk (*) is an aspherical surface, of which the surface shape is defined by formula (AS) below. The data of each aspherical surface are also listed together with other data in the construction data.

$$X(H) = (C \cdot H^2)/(1 + \sqrt{1 - \epsilon \cdot C^2 \cdot H^2}) + (A4 \cdot H^4 + A6 \cdot H^6 + A8 \cdot H^8 + A10 \cdot H^{10}) \qquad (AS)$$

where

X(H) represents the displacement along the optical axis at the height H (with respect to the vertex);

H represents the height in a direction perpendicular to the optical axis;

C represents the paraxial curvature;

$\epsilon$ represents the quadric surface parameter; and

Ai represents the aspherical surface coefficient of the i-th order.

FIGS. 7A–7I, 8A–8I, 9A–9I, 10A–10I, 11A–11I, and 12A–12I are diagrams showing the aberrations observed in Examples 1 to 6, respectively. Of these diagrams, FIGS. 7A–7C, 8A–8C, 9A–9C, 10A–10C, 11A–11C, and 12A–12C show the aberrations observed at the wide-angle end [W], FIGS. 7D–7F, 8D–8F, 9D–9F, 10D–10F, 11D–11F, and 12D–12F show the aberrations observed at the middle [M], and FIGS. 7G–7I, 8G–8I, 9G–9I, 10G–10I, 11G–11I, and 12G–12I show the aberrations observed at the telephoto end [T]. Of these diagrams, FIGS. 7A, 7D, 7G, 8A, 8D, 8G, 9A, 9D, 9G, 10A, 10D, 10G, 11A, 11D, 11G, 12A, 12D, and 12G show spherical aberration and the sine condition, FIGS. 7B, 7E, 7H, 8B, 8E, 8H, 9B, 9E, 9H, 10B, 10E, 10H, 11B, 11E, 11H, 12B, 12E, and 12H show astigmatism, and FIGS. 7C, 7F, 7I, 8C, 8F, 8I, 9C, 9F, 9I, 10C, 10F, 10I, 11C, 11F, 11I, 12C, 12F, and 12I show distortion. In each diagram, Y' represents the maximum image height. In the diagrams showing spherical aberration, a solid line (d) indicates the spherical aberration for the d line, a dash-and-dot line (g) indicates the spherical aberration for the g line, a dash-dot-dot line (c) indicates the spherical aberration for the c line, and a broken line (SC) indicates the sine condition. In the diagrams showing astigmatism, a broken line (DM) indicates the astigmatism for the d line as observed on the meridional plane, and a solid line (DS) indicates the astigmatism for the d line as observed on the sagittal plane. In the diagrams showing distortion, a solid line indicates the distortion (%) for the d line.

As described above, according to the present invention, it is possible to realize a taking lens apparatus provided with a compact, high-zoom-ratio, but nevertheless high-performance zoom lens system. By applying the present invention in digital cameras, video cameras, and cameras built in or externally fitted to personal computers, mobile computers, portable telephones, personal digital assistants (PDAs), and the like, it is possible to achieve satisfactory compactness, high zoom ratios, and high optical performance in such devices.

TABLE 1

Example 1
$f = 7.17 \sim 19.39 \sim 27.44$, FN0 = $2.98 \sim 3.58 \sim 3.69$

| Radius of Curvature | Axial Distance | Refractive Index | Abbe Number |
|---|---|---|---|
| r1 = 41.634 | d1 = 1.100 | N1 = 1.83350 | ν1 = 21.00 |
| r2 = 25.936 | d2 = 3.780 | N2 = 1.75450 | ν2 = 51.57 |
| r3 = 131.591 | d3 = 0.100 | | |
| r4 = 19.149 | d4 = 3.089 | N3 = 1.49310 | ν3 = 83.58 |
| r5 = 48.179 | d5 = 0.900 ~ 10.875 ~ 14.065 | | |
| r6 = 26.434 | d6 = 0.750 | N4 = 1.75450 | ν4 = 51.57 |
| r7 = 5.738 | d7 = 3.604 | | |
| r8 = −16.645 | d8 = 0.650 | N5 = 1.69680 | ν5 = 56.47 |
| r9 = 13.081 | d9 = 0.500 | | |
| r10* = 11.585 | d10 = 2.500 | N6 = 1.84506 | ν6 = 23.66 |
| r11* = 81.076 | d11 = 10.832 ~ 3.527 ~ 1.500 | | |
| r12 = ∞(SP) | d12 = 1.000 | | |
| r13 = 43.905 | d13 = 2.090 | N7 = 1.72916 | ν7 = 54.67 |
| r14 = −8.586 | d14 = 0.700 | N8 = 1.85000 | ν8 = 40.04 |
| r15 = −39.965 | d15 = 2.298 ~ 0.300 ~ 0.300 | | |
| r16 = 6.982 | d16 = 3.500 | N9 = 1.58913 | ν9 = 61.11 |
| r17 = 53.652 | d17 = 1.472 | | |
| r18* = −329.100 | d18 = 1.859 | N10 = 1.84506 | ν10 = 23.66 |
| r19* = 15.146 | d19 = 1.200 | | |
| r20 = 8.679 | d20 = 2.650 | N11 = 1.48749 | ν11 = 70.44 |
| r21 = 125.894 | d21 = 5.406 ~ 9.036 ~ 9.816 | | |
| r22 = ∞ | d22 = 3.000 | N12 = 1.51680 | ν12 = 64.20 |
| r23 = ∞ | | | |

Aspherical Surface Data of the 10th Surface (r10)
ε = 1.00000
A4 = 0.55964 × 10$^{-4}$
A6 = −0.13119 × 10$^{-5}$
A8 = −0.18275 × 10$^{-6}$
Aspherical Surface Data of the 11th Surface (r11)
ε = 1.00000
A4 = 0.52847 × 10$^{-4}$
A6 = −0.10695 × 10$^{-5}$
A8 = −0.18285 × 10$^{-6}$
Aspherical Surface Data of the 18th Surface (r18)
ε = 1.00000
A4 = 0.73476 × 10$^{-3}$
A6 = −0.20772 × 10$^{-4}$
A8 = −0.12834 × 10$^{-6}$
Aspherical Surface Data of the 19th Surface (r19)
ε = 1.00000
A4 = 0.16025 × 10$^{-2}$
A6 = 0.58744 × 10$^{-5}$
A8 = 0.15147 × 10$^{-6}$

TABLE 2

Example 2
$f = 5.40 \sim 13.90 \sim 31.00$, FN0 = $2.91 \sim 3.42 \sim 3.69$

| Radius of Curvature | Axial Distance | Refractive Index | Abbe Number |
|---|---|---|---|
| r1 = 61.137 | d1 = 1.100 | N1 = 1.80518 | ν1 = 25.43 |
| r2 = 27.581 | d2 = 5.000 | N2 = 1.49310 | ν2 = 83.58 |
| r3 = −105.275 | d3 = 0.100 | | |
| r4 = 20.146 | d4 = 2.667 | N3 = 1.78100 | ν3 = 44.55 |
| r5 = 36.805 | d5 = 0.850 ~ 10.983 ~ 18.820 | | |
| r6 = 24.459 | d6 = 0.750 | N4 = 1.75450 | ν4 = 51.57 |
| r7 = 5.771 | d7 = 3.683 | | |
| r8 = −13.089 | d8 = 0.650 | N5 = 1.61800 | ν5 = 63.39 |
| r9 = 14.445 | d9 = 0.500 | | |
| r10* = 12.512 | d10 = 2.455 | N6 = 1.84506 | ν6 = 23.66 |
| r11* = 90.973 | d11 = 15.836 ~ 6.454 ~ 1.500 | | |
| r12 = ∞(SP) | d12 = 1.000 | | |
| r13 = 40.325 | d13 = 2.093 | N7 = 1.72916 | ν7 = 54.67 |
| r14 = −9.013 | d14 = 0.700 | N8 = 1.85000 | ν8 = 40.04 |
| r15 = −39.711 | d15 = 3.033 ~ 0.700 ~ 0.300 | | |
| r16 = 6.951 | d16 = 3.500 | N9 = 1.58913 | ν9 = 61.11 |
| r17 = 65.236 | d17 = 1.589 | | |
| r18* = 1136.648 | d18 = 1.709 | N10 = 1.84506 | ν10 = 23.66 |
| r19* = 11.961 | d19 = 1.200 | | |
| r20 = 8.223 | d20 = 2.650 | N11 = 1.48749 | ν11 = 70.44 |
| r21 = 144.688 | d21 = 3.650 ~ 6.938 ~ 8.580 | | |
| r22 = ∞ | d22 = 3.000 | N12 = 1.51680 | ν12 = 64.20 |
| r23 = ∞ | | | |

Aspherical Surface Data of the 10th Surface (r10)
ε = 1.00000
A4 = 0.10832 × 10$^{-3}$
A6 = −0.16138 × 10$^{-5}$
A8 = −0.18581 × 10$^{-6}$
Aspherical Surface Data of the 11th Surface (r11)
ε = 1.00000
A4 = 0.95767 × 10$^{-4}$
A6 = −0.72129 × 10$^{-6}$
A8 = −0.20064 × 10$^{-6}$
Aspherical Surface Data of the 18th Surface (r18)
ε = 1.00000
A4 = 0.70719 × 10$^{-3}$
A6 = −0.28509 × 10$^{-4}$
A8 = 0.85712 × 10$^{-7}$
Aspherical Surface Data of the 19th Surface (r19)
ε = 1.00000
A4 = 0.16595 × 10$^{-2}$
A6 = −0.33283 × 10$^{-5}$
A8 = 0.52834 × 10$^{-6}$

TABLE 3

Example 3
$f = 7.14 \sim 23.15 \sim 68.60$, FN0 = $2.33 \sim 3.00 \sim 3.70$

| Radius of Curvature | Axial Distance | Refractive Index | Abbe Number |
|---|---|---|---|
| r1 = 81.973 | d1 = 1.400 | N1 = 1.84700 | ν1 = 24.84 |
| r2 = 61.207 | d2 = 5.961 | N2 = 1.49310 | ν2 = 83.58 |
| r3 = 856.502 | d3 = 0.100 | | |
| r4 = 45.555 | d4 = 4.773 | N3 = 1.49310 | ν3 = 83.58 |
| r5 = 103.248 | d5 = 0.900 ~ 30.274 ~ 52.572 | | |
| r6* = 32.565 | d6 = 1.800 | N4 = 1.77250 | ν4 = 49.77 |
| r7* = 10.160 | d7 = 6.937 | | |
| r8 = −34.736 | d8 = 1.100 | N5 = 1.71218 | ν5 = 47.10 |
| r9 = 32.109 | d9 = 0.100 | | |
| r10 = 23.896 | d10 = 3.352 | N6 = 1.84666 | ν6 = 23.82 |
| r11 = −113.596 | d11 = 2.273 | | |
| r12 = −15.197 | d12 = 1.077 | N7 = 1.49310 | ν7 = 83.58 |
| r13 = −35.767 | d13 = 30.489 ~ 7.350 ~ 0.500 | | |
| r14 = ∞(SP) | d14 = 0.0 | | |
| r15 = 12.732 | d15 = 2.253 | N8 = 1.75847 | ν8 = 50.89 |
| r16 = −343.551 | d16 = 4.695 | | |
| r17* = −26.163 | d17 = 1.500 | N9 = 1.67227 | ν9 = 30.69 |
| r18* = 12.288 | d18 = 0.685 | | |
| r19 = 13.470 | d19 = 2.599 | N10 = 1.48749 | ν10 = 70.44 |
| r20 = −17.432 | d20 = 1.898 ~ 3.215 ~ 15.554 | | |
| r21 = 3425.596 | d21 = 0.899 | N11 = 1.63197 | ν11 = 31.41 |
| r22 = 22.225 | d22 = 0.827 | | |
| r23 = −596.274 | d23 = 1.500 | N12 = 1.75450 | ν12 = 51.57 |
| r24 = −54.401 | d24 = 0.460 ~ 0.321 ~ 9.254 | | |
| r25 = 20.563 | d25 = 4.140 | N13 = 1.75450 | ν13 = 51.57 |
| r26 = −33.868 | d26 = 0.129 | | |
| r27 = −29.329 | d27 = 2.800 | N14 = 1.64867 | ν14 = 29.97 |
| r28 = 26.044 | d28 = 0.101 | | |

TABLE 3-continued

Example 3
f = 7.14 ~ 23.15 ~ 68.60, FN0 = 2.33 ~ 3.00 ~ 3.70

| Radius of Curvature | Axial Distance | Refractive Index | Abbe Number |
|---|---|---|---|
| r29 = 27.832 | d29 = 4.882 | N15 = 1.79850 | ν15 = 22.60 |
| r30 = 876.079 | d30 = 1.000 ~ 7.634 ~ 6.206 | | |
| r31 = ∞ | d31 = 3.000 | N16 = 1.51680 | ν16 = 64.20 |
| r32 = ∞ | | | |

Aspherical Surface Data of the 6th Surface (r6)
$\epsilon = 1.00000$
$A4 = 0.34691 \times 10^{-5}$
$A6 = -0.73603 \times 10^{-7}$
$A8 = 0.53336 \times 10^{-9}$
Aspherical Surface Data of the 7th Surface (r7)
$\epsilon = 1.00000$
$A4 = -0.23921 \times 10^{-4}$
$A6 = -0.24238 \times 10^{-6}$
$A8 = -0.37119 \times 10^{-8}$
Aspherical Surface Data of the 17th Surface (r17)
$\epsilon = 1.00000$
$A4 = -0.29274 \times 10^{-3}$
$A6 = 0.76183 \times 10^{-5}$
$A8 = -0.95192 \times 10^{-7}$
Aspherical Surface Data of the 18th Surface (r18)
$\epsilon = 1.00000$
$A4 = -0.12200 \times 10^{-3}$
$A6 = 0.82935 \times 10^{-5}$
$A8 = -0.10737 \times 10^{-6}$

TABLE 4

Example 4
f = 7.14 ~ 20.01 ~ 49.03, FN0 = 2.50 ~ 3.03 ~ 3.66

| Radius of Curvature | Axial Distance | Refractive Index | Abbe Number |
|---|---|---|---|
| r1 = 111.111 | d1 = 1.400 | N1 = 1.79850 | ν1 = 22.60 |
| r2 = 85.390 | d2 = 4.303 | N2 = 1.49310 | ν2 = 83.58 |
| r3 = −1831.972 | d3 = 0.100 | | |
| r4 = 43.431 | d4 = 4.988 | N3 = 1.49310 | ν3 = 83.58 |
| r5 = 130.083 | d5 = 0.900 ~ 24.171 ~ 43.681 | | |
| r6 = 35.035 | d6 = 1.200 | N4 = 1.75450 | ν4 = 51.57 |
| r7 = 10.040 | d7 = 4.791 | | |
| r8 = −96.605 | d8 = 1.100 | N5 = 1.75450 | ν5 = 51.57 |
| r9 = 15.175 | d9 = 1.925 | | |
| r10* = 25.398 | d10 = 3.981 | N6 = 1.84666 | ν6 = 23.82 |
| r11* = 43.373 | d11 = 1.258 | | |
| r12 = −15.932 | d12 = 1.000 | N7 = 1.48749 | ν7 = 70.44 |
| r13 = −134.899 | d13 = 20.871 ~ 5.426 ~ 0.600 | | |
| r14 = ∞(SP) | d14 = 0.600 | | |
| r15 = 11.251 | d15 = 2.129 | N8 = 1.75450 | ν8 = 51.57 |
| r16 = 422.558 | d16 = 4.585 | | |
| r17* = −39.509 | d17 = 1.500 | N9 = 1.70395 | ν9 = 26.41 |
| r18* = 12.891 | d18 = 0.596 | | |
| r19 = 12.874 | d19 = 2.614 | N10 = 1.48749 | ν10 = 70.44 |
| r20 = −14.240 | d20 = 1.806 ~ 1.837 ~ 3.682 | | |
| r21 = −8157.937 | d21 = 0.800 | N11 = 1.71649 | ν11 = 25.74 |
| r22 = 13.228 | d22 = 0.445 | | |
| r23 = 13.631 | d23 = 1.919 | N12 = 1.48749 | ν12 = 70.44 |
| r24 = 668.856 | d24 = 3.002 ~ 1.300 ~ 12.240 | | |
| r25 = 31.322 | d25 = 1.691 | N13 = 1.79850 | ν13 = 22.60 |
| r26 = 217.261 | d26 = 0.500 ~ 9.743 ~ 7.994 | | |
| r27 = 18.461 | d27 = 4.643 | N14 = 1.79850 | ν14 = 22.60 |
| r28 = −11.955 | d28 = 0.460 | N15 = 1.83724 | ν15 = 30.17 |
| r29 = 21.532 | d29 = 1.000 | | |
| r30 = ∞ | d30 = 3.000 | N16 = 1.51680 | ν16 = 64.20 |
| r31 = ∞ | | | |

Aspherical Surface Data of the 10th Surface (r10)
$\epsilon = 1.00000$
$A4 = 0.34767 \times 10^{-4}$
$A6 = 0.63939 \times 10^{-7}$
$A8 = -0.15659 \times 10^{-8}$
Aspherical Surface Data of the 11th Surface (r11)

TABLE 4-continued

Example 4
f = 7.14 ~ 20.01 ~ 49.03, FN0 = 2.50 ~ 3.03 ~ 3.66

| Radius of Curvature | Axial Distance | Refractive Index | Abbe Number |
|---|---|---|---|

$\epsilon = 1.00000$
$A4 = -0.11239 \times 10^{-3}$
$A6 = -0.50907 \times 10^{-4}$
$A8 = -0.20881 \times 10^{-8}$
Aspherical Surface Data of the 17th Surface (r17)
$\epsilon = 1.00000$
$A4 = -0.53164 \times 10^{-3}$
$A6 = 0.11706 \times 10^{-4}$
$A8 = -0.13639 \times 10^{-6}$
Aspherical Surface Data of the 18th Surface (r18)
$\epsilon$ 1.00000
$A4 = -0.23930 \times 10^{-3}$
$A6 = 0.14046 \times 10^{-4}$
$A8 = -0.15638 \times 10^{-6}$

TABLE 5

Example 5
f = 7.53 ~ 25.47 ~ 50.62, FN0 = 2.49 ~ 3.05 ~ 3.60

| Radius of Curvature | Axial Distance | Refractive Index | Abbe Number |
|---|---|---|---|
| r1 = 61.849 | d1 = 1.200 | N1 = 1.78578 | ν1 = 23.00 |
| r2 = 49.954 | d2 = 3.953 | N2 = 1.49310 | ν2 = 83.58 |
| r3 = 270.579 | d3 = 0.100 | | |
| r4 = 58.704 | d4 = 2.800 | N3 = 1.49310 | ν3 = 83.58 |
| r5 = 162.001 | d5 = 1.000 ~ 30.382 ~ 47.888 | | |
| r6 = 35.027 | d6 = 0.800 | N4 = 1.75450 | ν4 = 51.57 |
| r7 = 9.368 | d7 = 7.570 | | |
| r8 = −36.274 | d8 = 0.800 | N5 = 1.75450 | ν5 = 51.57 |
| r9 = 62.467 | d9 = 3.501 | N6 = 1.84831 | ν6 = 29.79 |
| r10 = −17.800 | d10 = 0.520 | | |
| r11 = −15.004 | d11 = 0.800 | N7 = 1.71236 | ν7 = 53.1 |
| r12* = −98.611 | d12 = 28.057 ~ 4.668 ~ 1.000 | | |
| r13 = ∞(SP) | d13 = 0.800 | | |
| r14 = 12.908 | d14 = 1.790 | N8 = 1.85000 | ν8 = 40.04 |
| r15 = 62.919 | d15 = 4.104 | | |
| r16 = 13.503 | d16 = 2.925 | N9 = 1.64205 | ν9 = 56.40 |
| r17 = −14.608 | d17 = 0.800 | N10 = 1.84666 | ν10 = 23.82 |
| r18 = 9.386 | d18 = 0.275 | | |
| r19 = 7.311 | d19 = 1.352 | N11 = 1.48853 | ν11 = 70.29 |
| r20* = 14.663 | d20 = 1.488 | | |
| r21 = 35.435 | d21 = 1.462 | N12 = 1.79850 | ν12 = 22.60 |
| r22 = −37.996 | d22 = 1.000 ~ 6.964 ~ 4.489 | | |
| r23 = 25.595 | d23 = 0.800 | N13 = 1.81916 | ν13 = 42.89 |
| r24 = 10.073 | d24 = 2.866 | | |
| r25 = 11.166 | d25 = 1.263 | N14 = 1.79850 | ν14 = 22.60 |
| r26 = 13.792 | d26 = 1.980 ~ 1.521 ~ 8.160 | | |
| r27 = 33.413 | d27 = 1.371 | N15 = 1.84666 | ν15 = 23.82 |
| r28 = 145.103 | d28 = 1.102 | | |
| r29 = ∞ | d29 = 3.000 | N16 = 1.51680 | ν16 = 64.20 |
| r30 = ∞ | | | |

Aspherical Surface Data of the 12th Surface (r12)
$\epsilon = 1.00000$
$A4 = -0.47667 \times 10^{-4}$
$A6 = -0.83476 \times 10^{-7}$
$A8 = -0.19331 \times 10^{-8}$
Aspherical Surface Data of the 20th Surface (r20)
$\epsilon = 1.00000$
$A4 = 0.52640 \times 10^{-3}$
$A6 = 0.39582 \times 10^{-5}$
$A8 = 0.74569 \times 10^{-7}$

TABLE 6

Example 6
f = 5.3 ~ 12.6 ~ 50.1, FN0 = 2.68 ~ 2.99 ~ 3.60

| Radius of Curvature | Axial Distance | Refractive Index | Abbe Number |
|---|---|---|---|
| r1 = 52.184 | d1 = 0.800 | N1 = 1.84666 | ν1 = 23.82 |
| r2 = 31.633 | d2 = 4.921 | N2 = 1.49310 | ν2 = 83.58 |
| r3 = 737.681 | d3 = 0.100 | | |
| r4 = 29.287 | d4 = 3.401 | N3 = 1.75450 | ν3 = 51.57 |
| r5 = 76.097 | d5 = 0.700 ~ 13.461 ~ 26.604 | | |
| r6 = 67.989 | d6 = 0.900 | N4 = 1.75450 | ν4 = 51.57 |
| r7* = 6.835 | d7 = 4.527 | | |
| r8 = −63.145 | d8 = 0.800 | N5 = 1.63854 | ν5 = 55.62 |
| r9 = 12.522 | d9 = 2.492 | N6 = 1.84666 | ν6 = 23.82 |
| r10* = 70.342 | d10 = 26.404 ~ 13.643 ~ 0.500 | | |
| r11 = ∞(SP) | d11 = 1.000 | | |
| r12 = 32.480 | d12 = 2.226 | N7 = 1.58267 | ν7 = 46.43 |
| r13 = −14.911 | d13 = 0.800 | N8 = 1.84666 | ν8 = 23.82 |
| r14 = −40.873 | d14 = 7.030 ~ 4.412 ~ 0.800 | | |
| r15 = 7.288 | d15 = 6.052 | N9 = 1.58267 | ν9 = 46.46 |
| r16 = −14.170 | d16 = 0.108 | | |
| r17* = −19.169 | d17 = 1.201 | N10 = 1.84666 | ν10 = 23.82 |
| r18* = 24.411 | d18 = 1.341 ~ ~ 3.960 ~ 7.572 | | |
| r19 = ∞ | d19 = 3.000 | N11 = 1.51680 | ν11 = 64.20 |
| r20 = ∞ | | | |

Aspherical Surface Data of the 7th Surface (r7)
ε = 1.00000
A4 = −0.30920 × 10$^{-5}$
A6 = −0.15275 × 10$^{-5}$
A8 = 0.13017 × 10$^{-6}$
A10 = −0.36324 × 10$^{-8}$ Aspherical Surface Data of the 10th Surface (r10)
ε = 1.00000
A4 = −0.92062 × 19$^{-4}$
A6 = −0.10571 × 10$^{-5}$
A8 = 0.40713 × 10$^{-7}$
A10 = −0.87049 × 10$^{-9}$ Aspherical Surface Data of the 17th Surface (r17)
ε = 1.00000
A4 = 0.30299 × 10$^{-3}$
A6 = −0.13575 × 10$^{-4}$
A8 = −0.51291 × 10$^{-6}$
A10 = 0.16304 × 10$^{-7}$ Aspherical Surface Data of the 18th Surface (r18)
ε = 1.00000
A4 = 0.10542 × 10$^{-2}$
A6 = 0.10270 × 10$^{-4}$
A8 = −0.11812 × 10$^{-5}$
A10 = 0.59254 × 10$^{-7}$

TABLE 7

Actual Values of Conditions (1) to (6)

| Example | (1) FW/IH | (2) ND | (3) VD | (4) FW/F1 | (5) FW/F3 | (6) FW/FR |
|---|---|---|---|---|---|---|
| 1 | 1.63 | 1.49310 | 83.58 | 0.194 | 0.169 | 0.498 |
| 2 | 1.80 | 1.49310 | 83.58 | 0.136 | 0.140 | 0.361 |
| 3 | 1.37 | 1.49310 | 83.58 | 0.072 | 0.348 | 0.282 |
| 4 | 1.30 | 1.49310 | 83.58 | 0.082 | 0.434 | 0.044 |
| 5 | 1.37 | 1.49310 | 83.58 | 0.078 | 0.503 | 0.148 |
| 6 | 1.58 | 1.49310 | 83.58 | 0.108 | 0.110 | 0.297 |

What is claimed is:

1. A taking lens apparatus comprising:
   a zoom lens system for focusing light from an object so as to form an optical image; and
   an image-sensing device for converting the optical image formed by said zoom lens system into an electric signal,
   wherein said zoom lens system comprises, from an object side:
      a first lens unit having a positive optical power and composed of three or fewer lens elements in total including at least one negative lens element and at least one positive lens element;
      a second lens unit having a negative optical power and moving, during zooming, in such a way as to be located always on an image-plane side of a position in which said second lens unit is located in a shortest-focal-length condition; and
      one or more succeeding lens units,
      wherein said zoom lens system permits a magnification to be varied by varying distances between said lens units
      wherein said zoom lens system fulfills the following conditions:

$0.92 < FW/IH < 1.85$;

$ND < 1.53$; and $VD > 78$, where
FW represents a focal length of said zoom lens system in the shortest-focal-length condition;
IH represents a maximum image height;
ND represents a refractive index for d line of at least one positive lens element included in said first lens unit; and
VD represents an Abbe number for d line of at least one positive lens element included in said first lens unit.

2. A taking lens apparatus as claimed in claim 1, wherein said first lens unit comprises three lens elements that are, from the object side, a negative lens element concave to the object side, a positive lens element convex to the object side, and a positive lens element convex to the object side.

3. A taking lens apparatus as claimed in claim 1, wherein, of said succeeding lens units, one disposed at an image-side end has a positive optical power.

4. A taking lens apparatus as claimed in claim 1, wherein, of said succeeding lens units, one disposed at an object-side end thereof as a third lens unit has a positive optical power.

5. A taking lens apparatus as claimed in claim 1, wherein said succeeding lens units include, from the object side thereof, a third lens unit having a positive optical power and a fourth lens unit having a positive optical power.

6. A taking lens apparatus as claimed in claim 1, wherein said succeeding lens units include, from the object side thereof, a third lens unit having a positive optical power, a fourth lens unit having a negative optical power, and a fifth lens unit having a positive optical power.

7. A taking lens apparatus as claimed in claim 1, wherein said succeeding lens units include, from the object side thereof, a third lens unit having a positive optical power, a fourth lens unit having a negative optical power, a fifth lens unit having a positive optical power, and a sixth lens unit having a positive optical power.

8. A taking lens apparatus as claimed in claim 1, wherein said first lens unit is kept in a fixed position during zooming.

9. A taking lens apparatus as claimed in claim 1, wherein said first lens unit moves toward the object side during zooming from the shortest-focal-length condition to a longest-focal-length condition.

10. A taking lens apparatus as claimed in claim 1, wherein, of said succeeding lens units, one disposed at an object-side end thereof as a third lens unit has a positive optical power and is kept in a fixed position during zooming.

11. A taking lens apparatus as claimed in claim 1, wherein, of said succeeding lens units, one disposed at an object-side end thereof as a third lens unit has a positive optical power and moves toward the object side during zooming from the shortest-focal-length condition to a longest-focal-length condition.

12. A taking lens apparatus as claimed in claim 1, wherein said zoom lens system fulfills the following condition:

$$0.06 < FW/F1 < 0.21$$

where

FW represents the focal length of said zoom lens system in the shortest-focal-length condition; and F1 represents a focal length of said first lens unit.

13. A taking lens apparatus as claimed in claim 1, wherein said zoom lens system fulfills the following condition:

$$0.12 < FW/F3 < 0.56$$

where

FW represents the focal length of said zoom lens system in the shortest-focal-length condition; and F3 represents a focal length of a lens unit that is disposed as a third lens unit at an object-side end of said succeeding lens units.

14. A taking lens apparatus as claimed in claim 1, wherein said zoom lens system fulfills the following condition:

$$0.03 < FW/FR < 0.55$$

where

FW represents the focal length of said zoom lens system in the shortest-focal-length condition; and FR represents a focal length of a lens unit that is disposed at an image-side end of said succeeding lens units.

15. A taking lens apparatus comprising:

a zoom lens system for focusing light from an object so as to form an optical image;

an image-sensing device for converting the optical image formed by said zoom lens system into an electric signal; and an optical low-pass filter, disposed in an optical path on the object side of said image-sensing device, for optically controlling a predetermined spatial frequency component included in the optical image formed by said zoom lens system, wherein said zoom lens system comprises, from an object side:

a first lens unit having a positive optical power and composed of three or fewer lens elements in total including at least one negative lens element and at least one positive lens element;

a second lens unit having a negative optical power and moving, during zooming, in such a way as to be located always on an image-plane side of a position in which said second lens unit is located in a shortest-focal-length condition; and one or more succeeding lens units, wherein said zoom lens system permits a magnification to be varied by varying distances between said lens units wherein said zoom lens system fulfills the following conditions:

$$0.92 < FW/IH < 1.85;$$

$$ND < 1.53; \text{ and}$$

$$VD > 78,$$

where

FW represents a focal length of said zoom lens system in the shortest-focal-length condition;

IH represents a maximum image height;

ND represents a refractive index for d line of at least one positive lens element included in said first lens unit; and VD represents an Abbe number for d line of at least one positive lens element included in said first lens unit.

16. A taking lens apparatus as claimed in claim 15, wherein said optical low-pass filter is disposed immediately on the object side of the image-sensing device.

17. A taking lens apparatus as claimed in claim 15, wherein said optical low-pass filter has a shape of a plane-parallel plate.

* * * * *